(12) United States Patent
Wippermann

(10) Patent No.: US 6,672,233 B2
(45) Date of Patent: Jan. 6, 2004

(54) FLOATING BODY

(76) Inventor: Gerhard Wippermann, Roermonder Strasse 117, D-41068 Mönchengladbach (DE)

( * ) Notice: Subject to any disclaimer, the term of this patent is extended or adjusted under 35 U.S.C. 154(b) by 0 days.

(21) Appl. No.: 10/240,623

(22) PCT Filed: Mar. 27, 2001

(86) PCT No.: PCT/EP01/03462

§ 371 (c)(1),
(2), (4) Date: Mar. 10, 2003

(87) PCT Pub. No.: WO01/72583

PCT Pub. Date: Oct. 4, 2001

(65) Prior Publication Data

US 2003/0164132 A1 Sep. 4, 2003

(30) Foreign Application Priority Data

Mar. 31, 2000 (DE) .......................... 100 15 990

(51) Int. Cl.⁷ .............................................. B63B 35/00
(52) U.S. Cl. ........................................ 114/66; 114/264
(58) Field of Search ............................ 114/66, 258, 264

(56) References Cited

U.S. PATENT DOCUMENTS

| 3,254,621 | A | * | 6/1966 | White | 114/66 |
| 3,708,991 | A | | 1/1973 | Barkley | |
| 4,554,883 | A | | 11/1985 | Lane | |
| 4,854,256 | A | * | 8/1989 | Hayashi | 114/61.1 |
| 5,988,088 | A | | 11/1999 | Ishida | |

FOREIGN PATENT DOCUMENTS

| DE | 29819997 | 12/1999 |
| FR | 2621004 | 3/1989 |
| WO | 8101539 | 6/1981 |

* cited by examiner

Primary Examiner—Jesus D. Sotelo
(74) Attorney, Agent, or Firm—Martin A. Farber

(57) ABSTRACT

The invention relates to a floating body, especially a floating body used as a support for an underwater tunnel (11). In order to obtain a high degree of freedom and a large amount of stability while at the same time guaranteeing easy assembly, a frame structure (49) is provided in the form of a horizontal grating, wherein floats, ballast bodies, dam chambers or similar useful hollow bodies (50) are fixed in the rectangular, especially quadratic free areas of said grating as tanks.

13 Claims, 22 Drawing Sheets

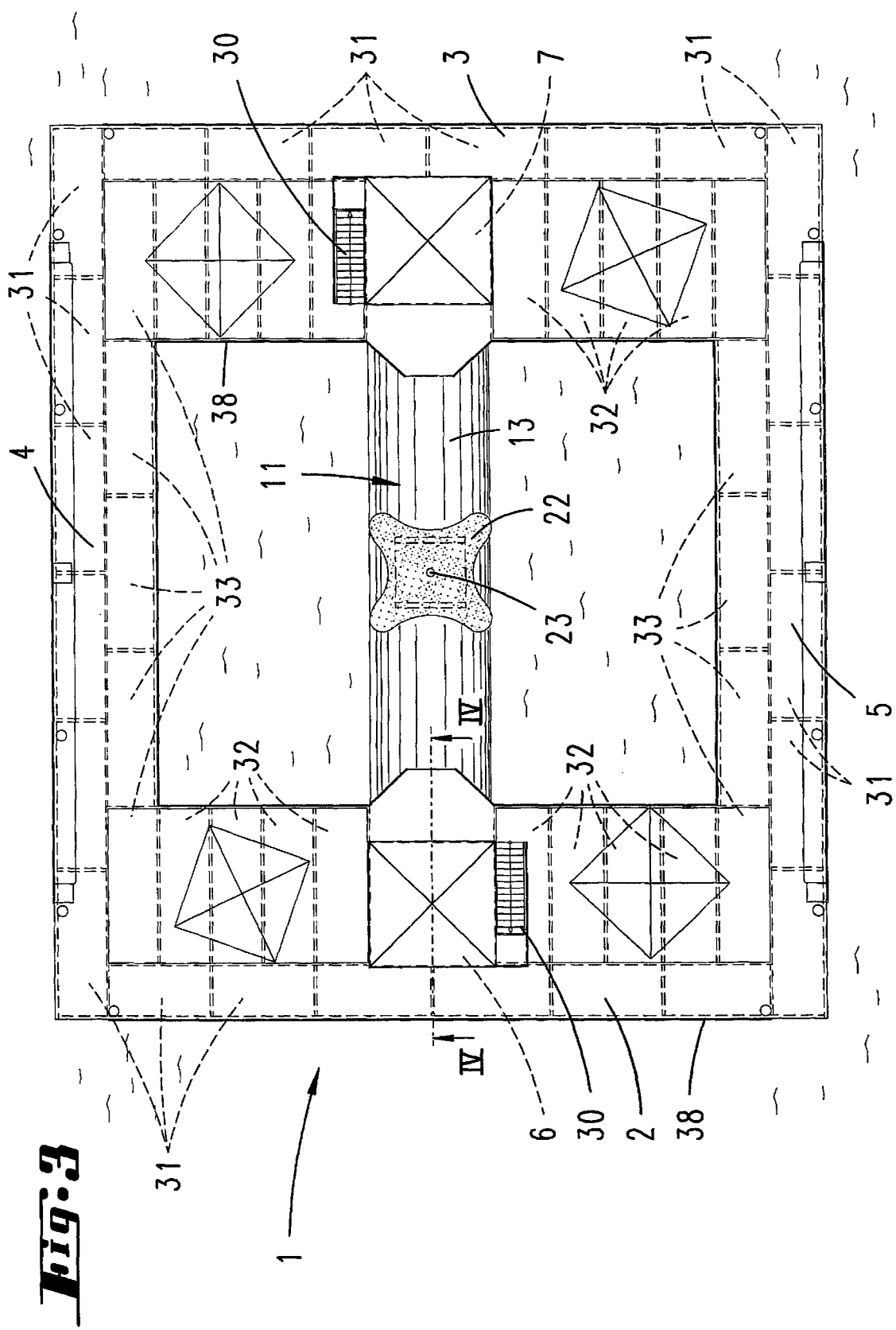

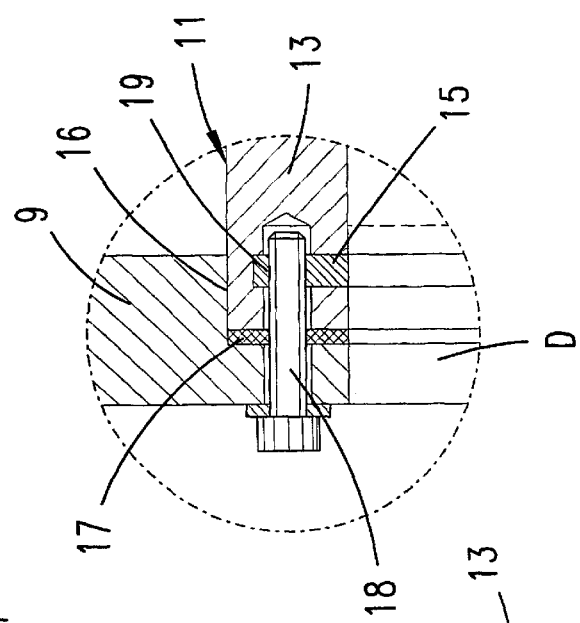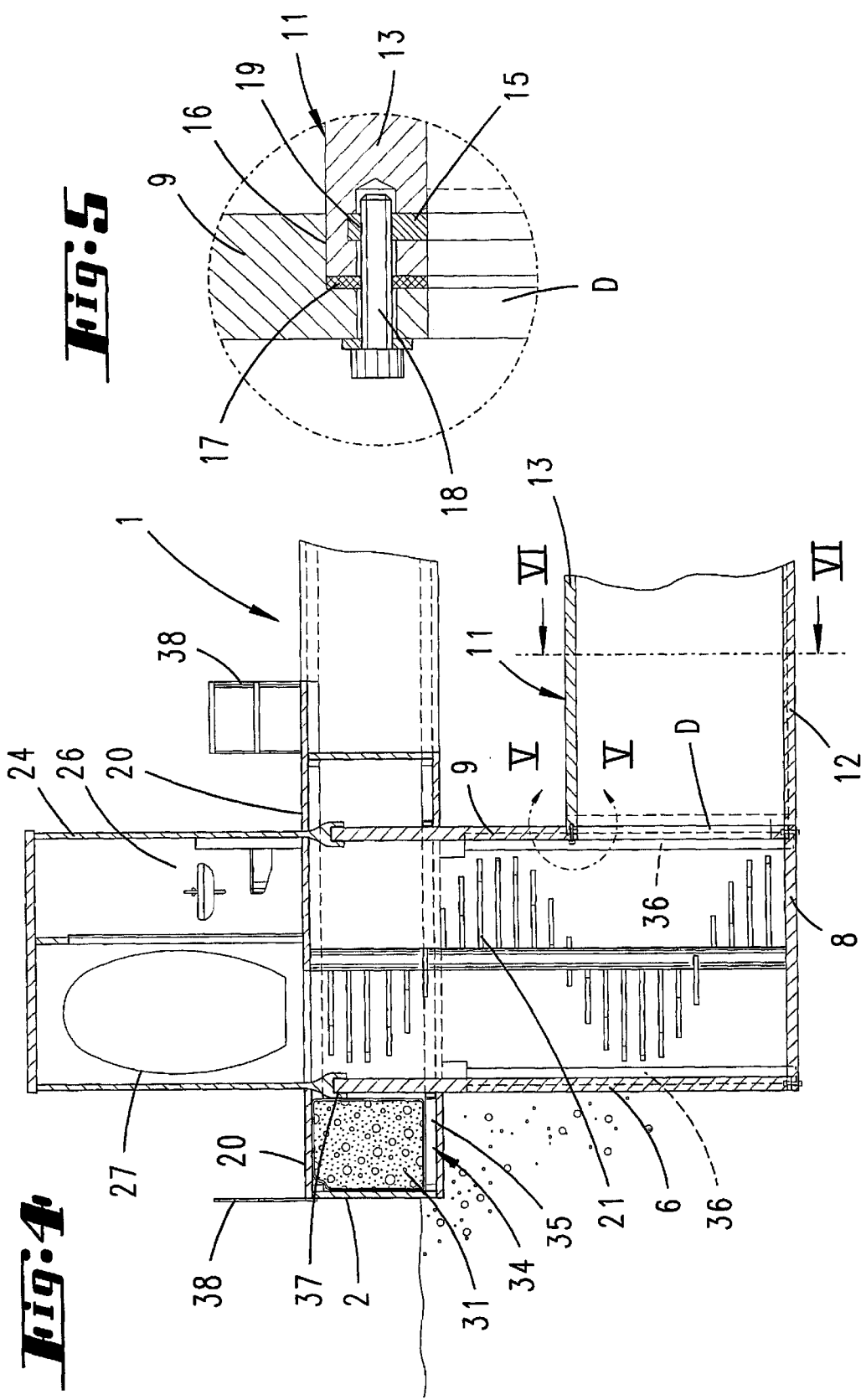

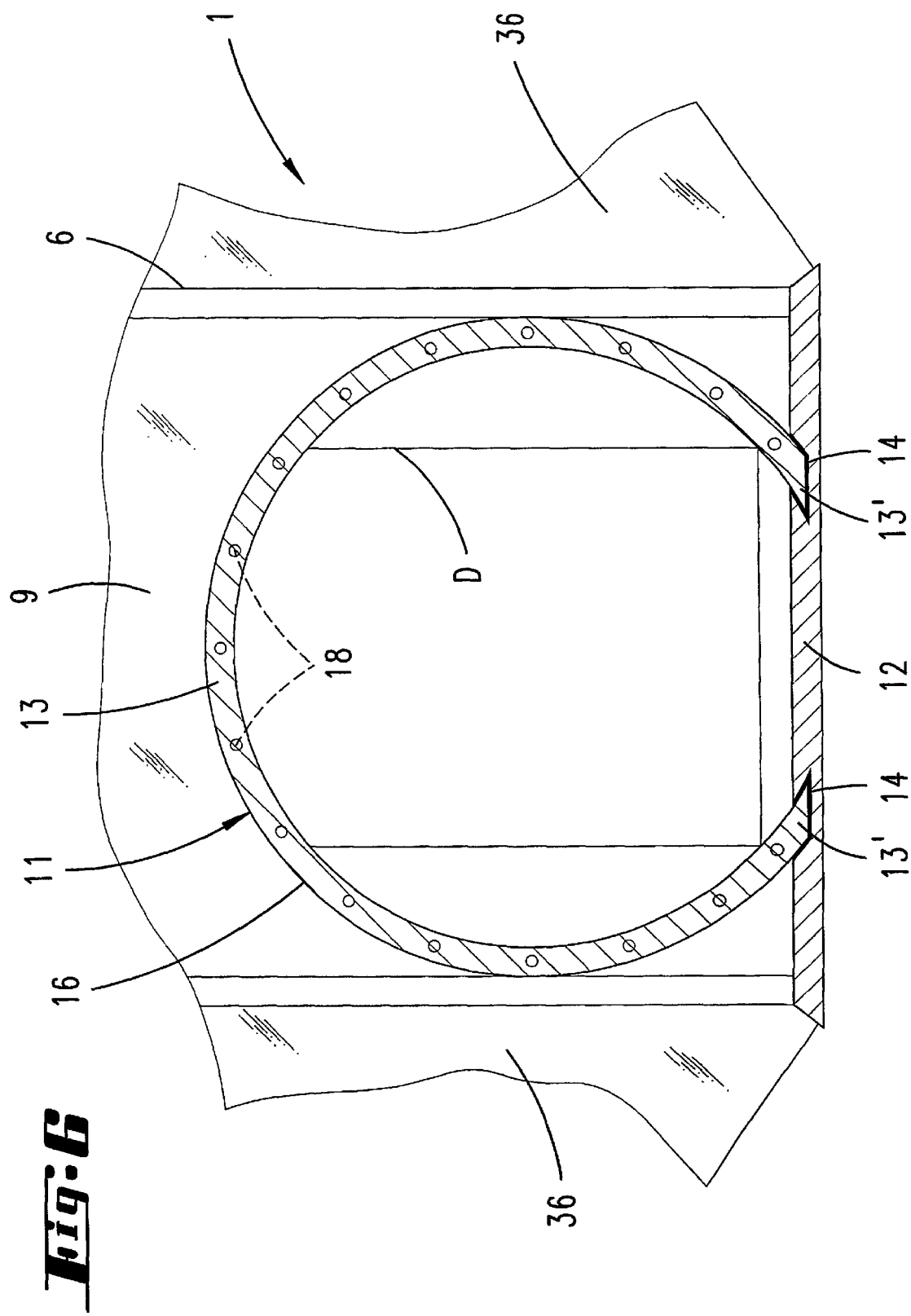

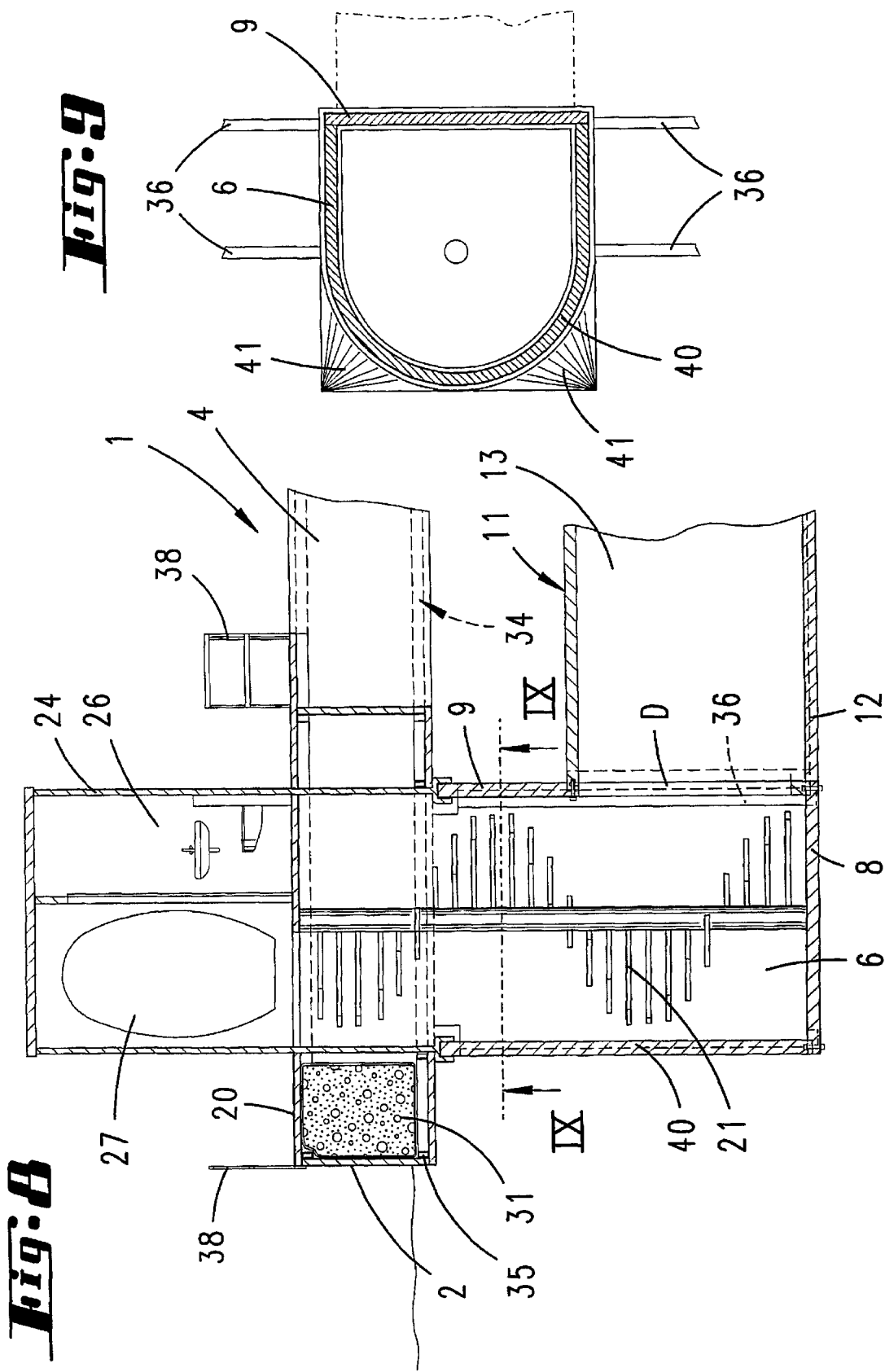

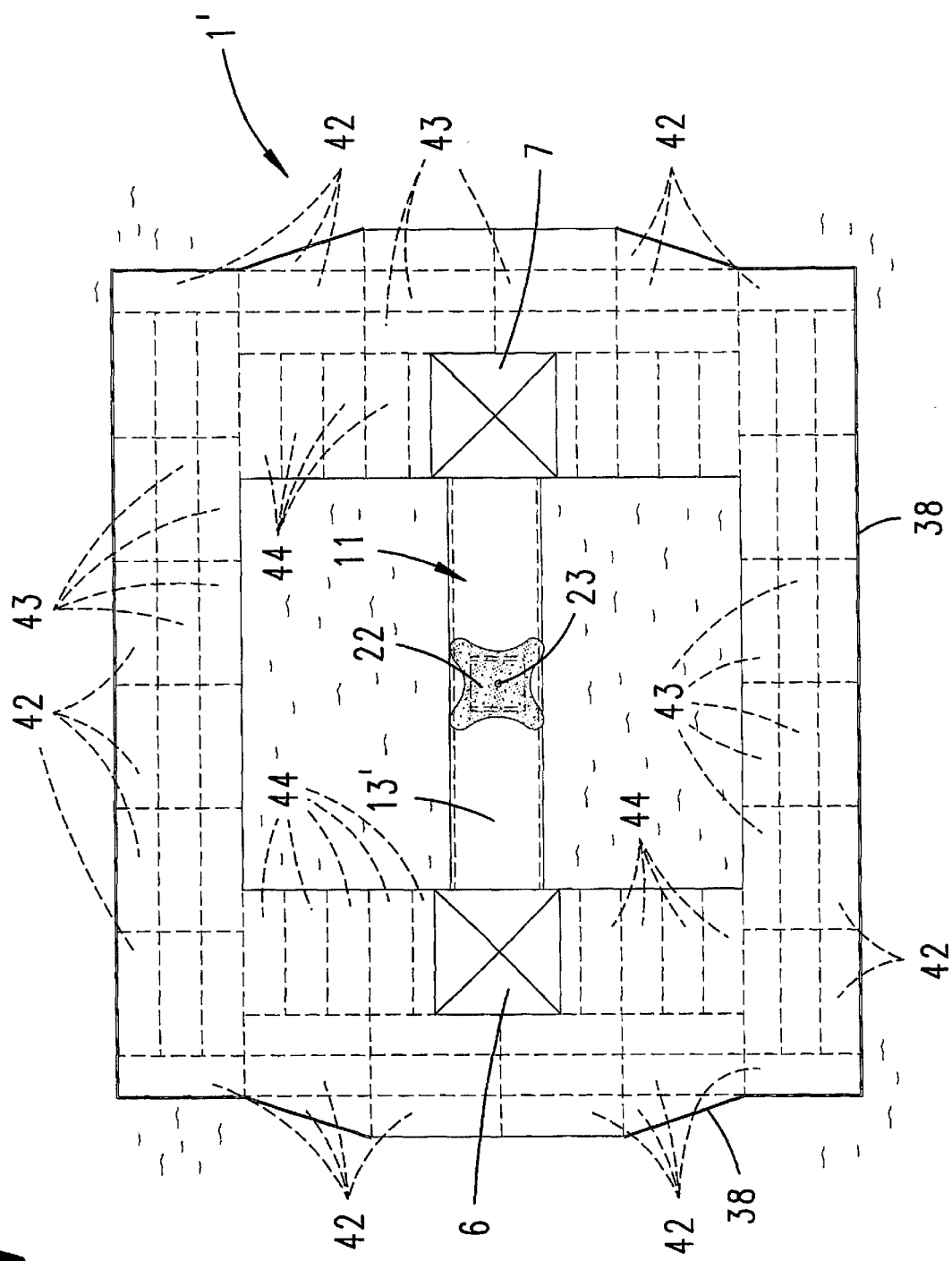

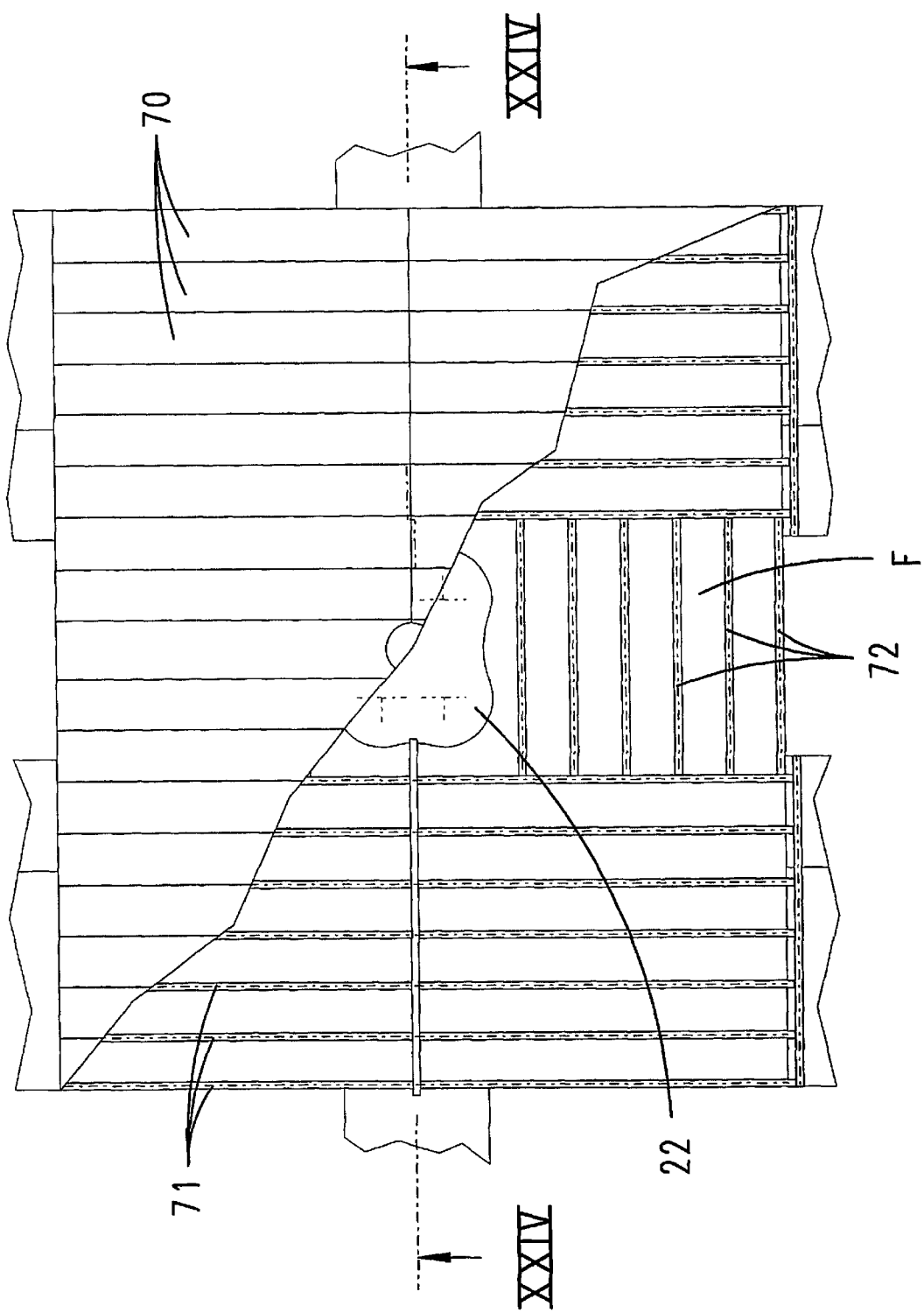

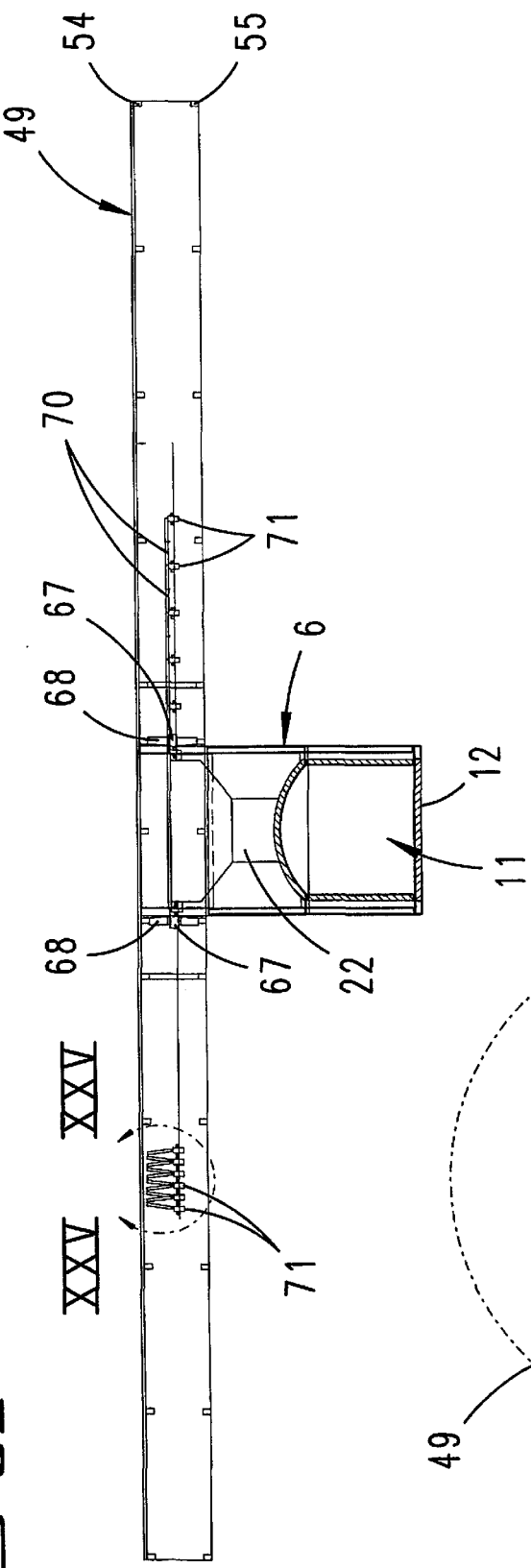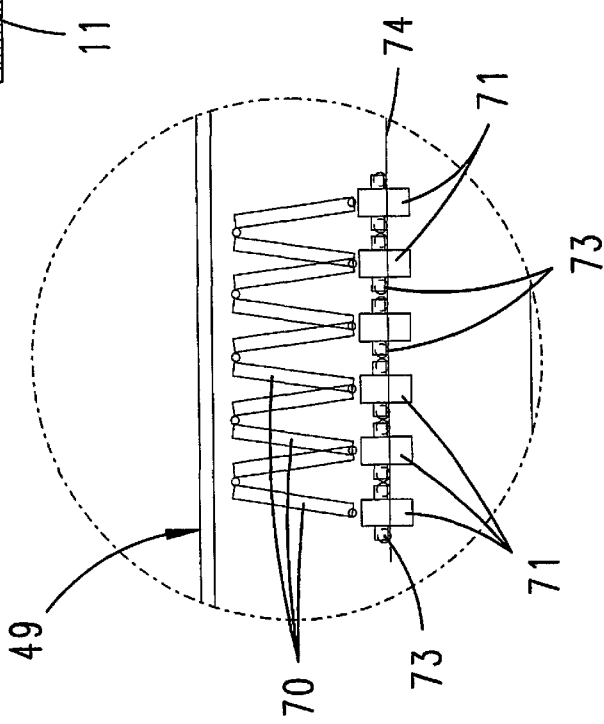

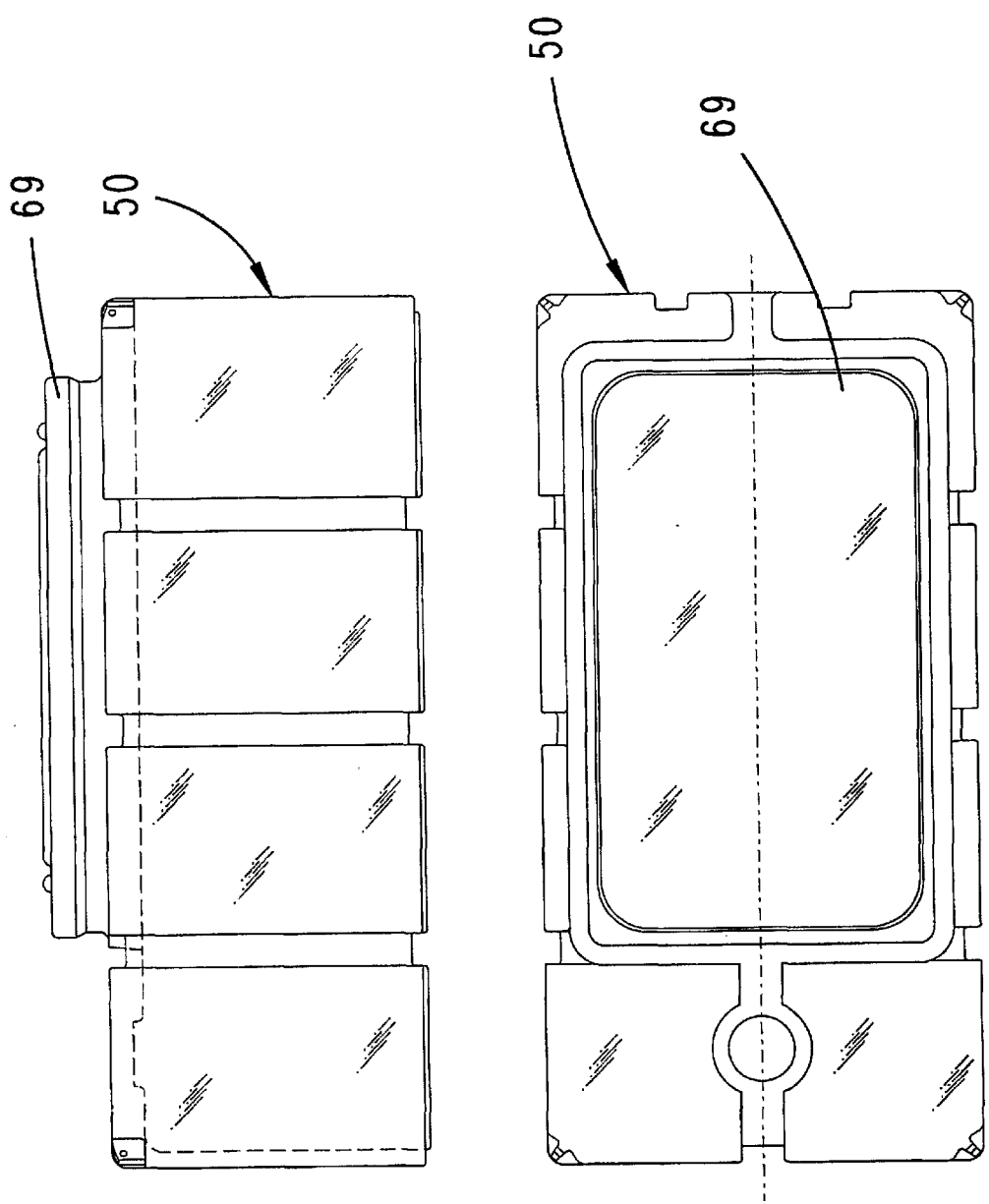

FLOATING BODY

FIELD AND BACKGROUND OF THE INVENTION

The invention relates to a floating body, in particular as a carrier of an underwater tunnel.

Floating bodies which have a cabin, underwater tunnel, etc. which lies below the water line and is made from transparent material, are known in the leisure sector. By way of example, the aqueous fauna can preferably be observed from there. In terms of their structure, floating bodies of this type are configured in the shape of a boat, and the corresponding floating body can be moved by means of muscle power or by being driven by engines.

SUMMARY OF THE INVENTION

The subject matter of the invention is based on the object of configuring a floating body of the type in question in such a manner that it is stable in use, so that it is able to accommodate a greater number of people yet nevertheless allows optimum observation of, for example, the aqueous fauna.

This object is achieved first of all and substantially in a floating body having the introductory-mentioned features, in which it is provided for there to be flexurally rigid supporting framework in the form of a horizontal grid, in the rectangular, in particular square grid open spaces or which hollow bodies, which can be used as tanks, buoyancy bodies, ballast bodies, storage chambers or the like, are secured.

On account of configuration of this nature, a floating body of the generic type, as well as having a particularly good load-bearing structure, provides a high quality of leisure and is able to accommodate a greater number of people. A significant component of the floating body is the flexurally rigid supporting framework. It is configured in the form of a horizontal grid. The grid openings or open grid spaces are used to accommodate the corresponding hollow bodies. Various possible ways of using the hollow bodies are available in this case. For example, they can be used as tanks, buoyancy bodies, ballast bodies, storage chambers or the like. The floating body itself is distinguished by two companionways, which lead below the water line, are spaced apart from one another and are connected to one another by a tunnel which lies below the water line and has an at least partially transparent wall. This makes the floating body suitable, for example, for a prescribed traffic passing through it. It is preferable for the tunnel lying below the water line to be reached through one companionway. After a certain residence time within the tunnel, it can be left via the other companionway, so that to a certain extent a circuit is walked through. The tunnel, which is equipped with an at least partially transparent wall, allows favorable observation of the underwater world which lies below the water line. In this case, the floating body is additionally stabilized by the tunnel connecting the two companionways, so that this also leads to an increased level of safety. Furthermore, the use of the two companionways which are spaced apart from one another by the tunnel brings benefits in terms of ventilation technology, which makes the time inside the tunnel very pleasant. Specifically, to a certain degree forced ventilation is produced. In particular, the inventive concept makes it possible to configure the floating body in frame form, specifically so that it surrounds an area of open water. In this case, the companionways are associated with two frame sections which lie opposite one another. The companionways, together with the tunnel connecting them, which crosses below the area of open water, stabilize this frame shape. The surface of the frame sections can be used as an accommodation area as a result of it accommodating, for example, lounger chairs, tables, etc. Moreover, it is possible to pass from one companionway to the other without using the tunnel. The frame shape then leads to a stabilization of the floating behavior of the floating body, so that the latter remains relatively stationary even in the event of high seas. The visitor who is inside the tunnel is provided with an optimum observation quality by the tunnel having a transparent floor. The observation quality is optimized through the fact that the tunnel wall as a whole is see-through. This creates a view on all sides, which is not to be found in, for example, submarines in use in the leisure sector. Construction advantages result from the fact that the tunnel comprises an arched piece and a straight floor piece, each made from see-through plastics. This material allows a tunnel length of approx. 10 m. The tunnel wall thickness, on the other hand, can be approx. 10 cm. Despite this relatively great length, the result is a high-strength structure which is able to withstand high forces. To ensure a high-strength connection between the tunnel and the companionways, the tunnel is bolted to the companionways by means of flanges, which flanges absorb the buoyancy forces. This is very important, since the relatively large-volume tunnel acts as a buoyancy body. In detail, what this means is that the flanges form steel-securing elements which have been cast into the plastics. As a result, bolted connection makes it possible to produce a highly stable connection between the companionways and the tunnel. To obtain an observation effect not only in the area of the tunnel but also in the area of the companionways, at least the area of the companionway which lies below the water line consists of see-through plastics. Therefore, there is uniformity of materials between tunnel and companionway, which leads to structural benefits. Furthermore, advantages in terms of the stability are achieved by the fact that the end side of the tunnel rests in a recess of matching shape in the companionway wall. To ensure that the platform of the floating body takes up little space compared to the tunnel, the companionways are equipped with spiral staircases, in particular made from see-through plastics. This once again has the effect that the spiral staircases, which consist in particular of see-through plastics, represent only an insignificant viewing obstacle. Furthermore, emphasis should be given to the fact that a space of increased cross section is provided disposed approximately in the center of the tunnel. Accordingly, more people can spend time there. This space of larger cross section also makes it possible, for example, to accommodate tables as well as chairs. To counteract the buoyancy forces acting on the tunnel, a ballast body is provided disposed in the center of the tunnel. This may, for example, be an island disposed on the tunnel. By way of example, the island may accommodate plants, so that the floating body acquires a favorable appearance. To ensure that, for example, no rain enters the companionways and therefore the tunnel, the companionways have cabins built above them. Furthermore, the cabins can be used to hold sanitary fittings. The floating body is then made virtually unsinkable by buoyancy bodies which extend virtually along the entire frame periphery. The fact that the ballast tanks are hollow bodies on the inner side of the frame contributes to the stable floating and load-bearing properties. The ballast tanks can be filled, for example, by means of sea water and/or drinking water. Furthermore, it is provided that the ballast tanks are individual hollow plastics bodies. Furthermore, the floating body may include buoyancy chambers which are flap-closed at the top side. They can be used, for example, as spaces for holding utensils belonging to the floating body, specifically when the latter is not in use. Structural and transportational benefits result from the floating body having a dismantleable framework comprising carriers. The horizontally running carriers carry the ballast tanks. To stabilize the dismantleable framework, the horizontal carriers are supported by vertical carriers, which are formed as gusset plates and which are secured to the companionways. The gusset plates are preferably of perforated configuration, so that reflections are minimized. However, the gusset plates may also be produced in frame form, for the abovementioned reason. Float engineering benefits for the floating body result from the fact that the ballast tanks are disposed parallel to the direction in which the tunnel extends, adjacent to the companionways. Furthermore, it should be noted that the vertical carriers consist of see-through plastics. To increase the surface area of the floating body, there is provision for there to be platforms fitted to the outer sides of the frame sections. The abovementioned buoyancy bodies which lie on the outer side of the frame may preferably consist of foamed plastics. In terms of weight, they can be kept very light yet can nevertheless have a high ability to float. With regard to transportation of the frame-like floating body, it has proven advantageous if the entire floating body, in the dismantled state, finds space to be accommodated in a plurality of 40-foot containers. In order then, when constructing the floating body, to be able to stably connect the cabin to the companionway, the upper edge of the companionway is adhesively bonded in a positively locking manner into a groove in the cabin wall. A floating body which comprises a multiplicity of individual elements which are connected to one another at vertical faces and are in the form of hollow cuboidal bodies is used to form the floating body. These hollow bodies are stabilized by tubes which are disposed therein, run in a straight line and open out in different vertical faces as spacer-stabilization elements to which pressure can be applied, a clamping element being guided through at least two mutually aligned tubes of two individual elements. Therefore, the entire floating body can be assembled in modular form from the hollow bodies, which for their part are stabilized by the tubes. For inexpensive production, it is recommended for the individual elements to be made from plastics and for them to be made using the rotational process. In this process, both the outer walls and the tubes are produced. It is even possible for the tubes to run on an incline, i.e. diagonally with respect to the longitudinal direction of the individual elements. In this way, it is possible to create a grid-like composite system in combination with a particularly high stability on the part of the floating body. It is even possible to provide a plurality of tubes which cross one another, specifically taking account of different planes. In this case, it is possible for individual elements which are of the same shape to acquire different functions. For example, if they are foamed they serve as hollow floating bodies. Furthermore, the individual elements may be fillable ballast tanks or storage spaces provided with a flap. The range of possible uses of the floating body can be widened by a net which is laid around the floating body, extends as far as the seabed or is closed at the bottom side. On this basis, it is possible to use the floating body as a dolphinarium. The visitors can take up position above or below the water line in the corresponding rooms. It is also advantageous for the edge-side individual elements to form a breakwater bead and, below it, a wave-rolling niche. This prevents the people on the platform of the floating body from being at risk of being sprayed in the event of normal wave motion. The fact that the grid webs, which border the open grid spaces, have upper and lower struts which are spaced apart from and parallel to one another, the spacing position of which is defined by vertical struts associated with the grid crossing points and which are reinforced by means of diagonal struts, leads to a highly loaded configuration. The supporting framework produced in this way has proven particularly stable under load, and in particular the forces which are active from different directions can be absorbed without damage. The measure whereby the grid webs which adjoin the companionways and the grid webs which delimit the area of open water consist of steel, in particular stainless steel, and the peripheral grid webs consist of fiberglass, has proven to be both stabilizing and weight-saving. The square open grid spacers can be dimensioned in such a way that they are each able to accommodate two hollow bodies. Production engineering and also stabilizing benefits result from the fact that the tunnel and the companionways are each see-through planked steel frame structures. Since considerable buoyancy forces emanate from the tunnel and the companionways and these forces have to be absorbed, the measure is taken whereby the companionways each use two laterally protruding bearing journals to divert the buoyancy forces into yokes of the supporting framework which are associated with the bearing journals. To increase the useable surface area of the supporting framework, the area of open water can be covered by boards. This additional area which is covered with boards can then be used, for example, as a dancefloor, etc. The boards are held in their position covering the area of open water by means of carriers which are stored below the edges of the frame and can be displaced over the area of open water. These carriers can roll over edge-side rails by means of rolls disposed at their ends, in order to move out of their concealed position into their supporting functional position.

BRIEF DESCRIPTION OF THE DRAWINGS

Three exemplary embodiments of the invention are explained below with reference to the drawings, in which:

FIG. 3 shows a plan view of the floating body, FIG. 4 shows the section on line IV—IV in FIG. 3, on a larger scale, FIG. 5 shows the detail indicated by line V—V in FIG. 4, FIG. 6 shows the section on line VI—VI in FIG. 4, FIG. 8 shows a similar view to FIG. 4 but of a modification of the floating body, FIG. 9 shows the section on line IX—IX in FIG. 8, FIG. 10 shows a plan view of the floating body in accordance with the second embodiment, FIG. 23 shows a plan view of the boards which cover the area of open water and are supported by carriers which can be displaced over the area of open water, FIG. 24 shows the section on line XXIV—XXIV in FIG. 23, FIG. 25 shows a detail indicated by XXV—XXV in FIG. 24, on an enlarged scale, FIG. 26 shows a side view of a hollow body, and FIG. 27 shows a plan view of the hollow body.

DETAILED DESCRIPTION OF THE PREFERRED EMBODIMENT

Figure 1:
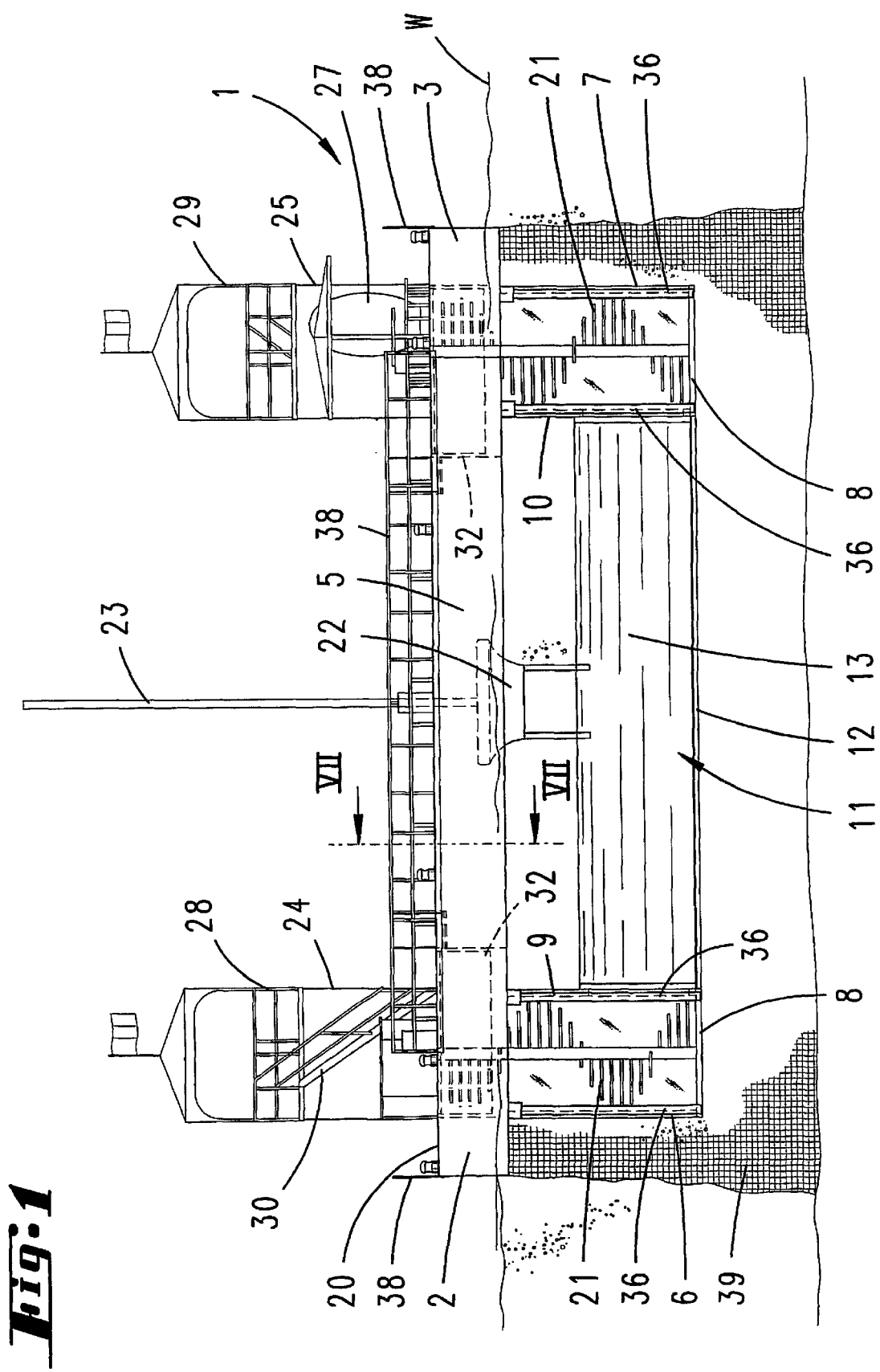
FIG. 1 shows a view of the floating body in accordance with the first embodiment.
Figure 2:
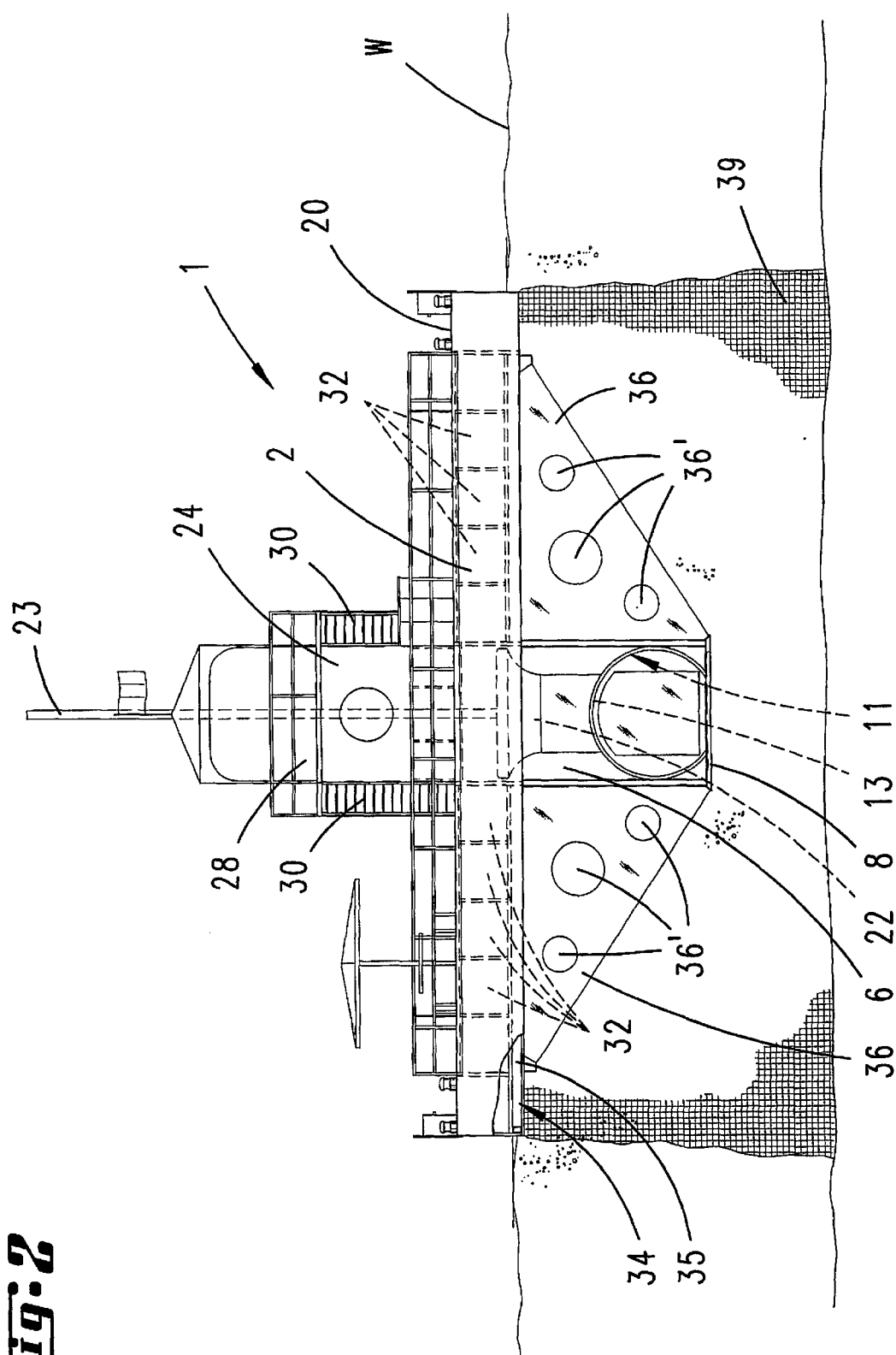
FIG. 2 shows a side view, rotated through 90°, of FIG. 1.
Figure 7:
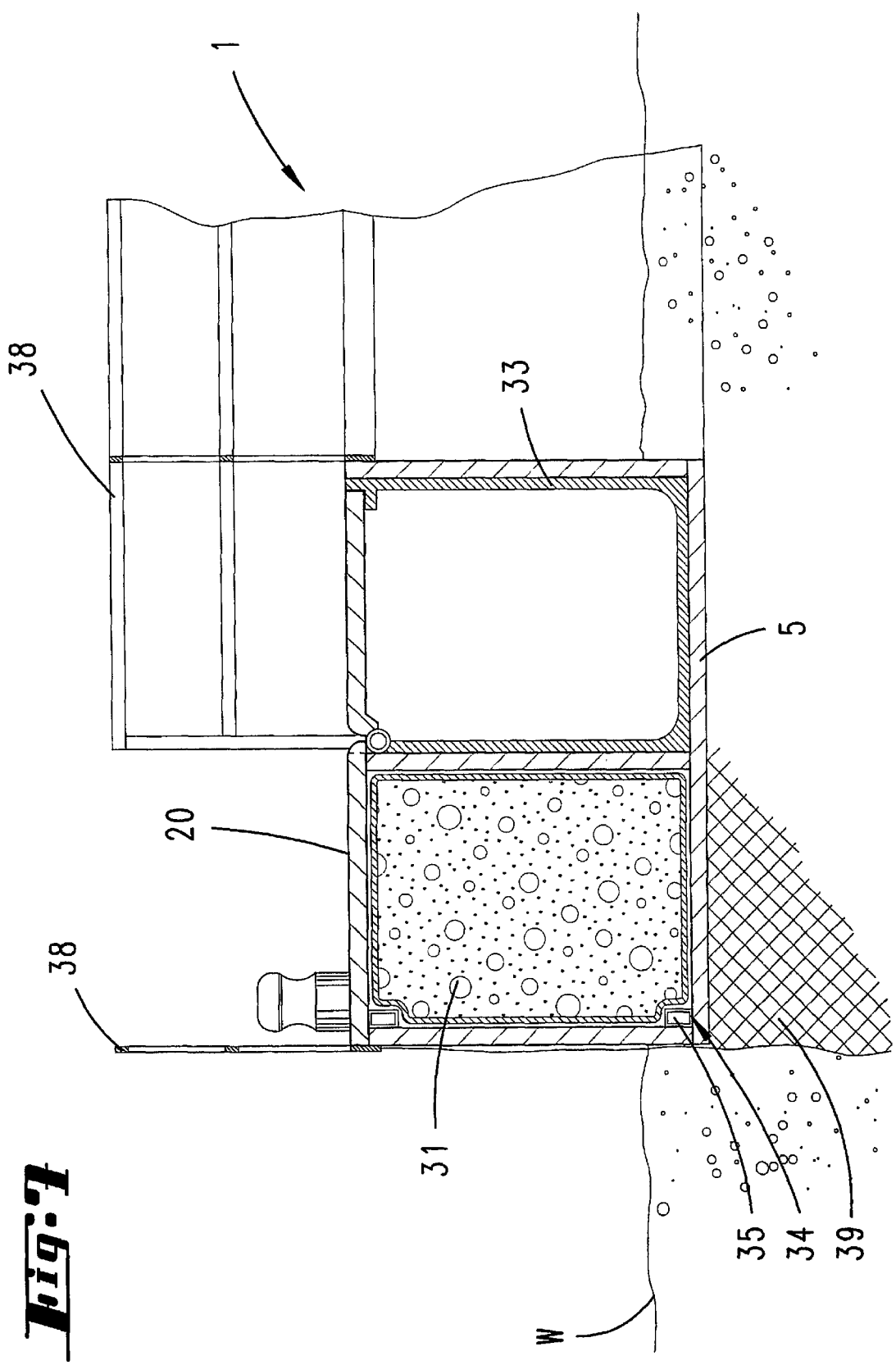
FIG. 7 shows the section on line VII—VII in FIG. 1.

The floating body which is illustrated in accordance with the first embodiment in FIGS. 1 to 7 and is denoted overall by the numeral 1 is produced in frame form and has the mutually opposite frame sections 2, 3 and 4, 5. In the exemplary embodiment, it is provided that the frame sections 4, 5 are longer than the frame sections 2, 3.

In the center, in each case one companionway 6, 7, which leads below the water line W and is approximately square in contour, originates from the shorter frame sections 2, 3. This companionway 6, 7 is closed off by a floor 8, so that it is impossible for any water to penetrate into the companionway 6, 7.

The mutually facing side walls 9, 10 of the companionways 6, 7 are connected to one another by a tunnel 11 which lies below the water line W, leaving clear a passage opening D. The tunnel floor 12 is flush with the floors 8 of the companionways 6, 7. The tunnel 11 is formed from an arched piece 13 and the straight floor piece which forms the tunnel floor 12. See-through plastics, for example acrylic sheet with a wall thickness of approx. 10 cm, is used as material for the arched piece 13 and the floor piece 12. The arched piece 13 can be produced, for example, by shaping in a heated mold, two halves which form the arched piece then being joined to one another. The two free ends 13' of the arched piece 13 penetrate in a positively fitting manner into longitudinal cutouts 14 in the tunnel floor 12, where they are welded or adhesively bonded in a suitable way, cf. FIG. 6. This figure also shows that the arched piece 13 is configured to be virtually in the shape of a circular ring.

According to the first embodiment, the tunnel 11 is approximately 10 m long. The tunnel 11 is connected to the companionways 6, 7 by means of flanges 15 which are incorporated at the tunnel ends. Each flange 15 represents a steel securing element which has been cast into the plastics. Each end side of the tunnel 11 rests in a recess 16 of matching shape in the corresponding companionway wall 9, 10. The buoyancy forces acting on the tunnel 11 are reliably absorbed by this positive lock, cf. in particular FIGS. 4 and 5. A seal 17 which lies within the recess 16 is associated with each end side of the arched piece 13. Securing bolts 18 which penetrate through the side walls 9, 10, engage in aligned threaded bores 19 in the flange 15 and thereby connect the tunnel 11 to the companionways 6, 7 to form a rigid, highly stable assembly, are used to connect the side wall 9, 10 to the arched piece 13.

At least the area of the companionway 6, 7 which lies below the water line W consists of see-through plastics. Once again, acrylic sheet can be used for this purpose.

Each companionway 6, 7 is equipped with a spiral staircase 21 which leads from the platform 20 of the floating body. See-through plastics are likewise suitable as material for the spiral staircase.

In the exemplary embodiment, it is illustrated that the tunnel 11 has the same cross section over its entire length. By way of example, however, it is also possible to create a space of larger cross section in the center of the tunnel, in order to create options for chairs, small tables, etc. to be accommodated there. To counteract the buoyancy forces which are acting on the tunnel 11, a ballast body 22 is provided in the center of the tunnel. In the exemplary embodiment, this ballast body forms an island disposed on the tunnel 11. It is possible for the island to be planted up and/or for it to have a mast 23 associated with it, the mast tip of which may, for example, bear a warning light. It is preferable for it to be possible to vary the mass of the ballast body 22.

Each companionway 6, 7 has in each case one cabin 24, 25, which projects above the platform 20, built above it. The contour of this cabin corresponds to that of the companionway 6, 7. In the exemplary embodiment, the cabins 24, 25 include sanitary fittings 26, in such a manner that, for example, the sanitary fittings 26 of the cabin 24 are intended for men and the sanitary fittings of the cabin 25 are intended for women. The cabins 24, 25 themselves are entered through entry openings 27. The cabins 24, 25 themselves may in turn also have viewing platforms 28, 29 built above them. Stairs 30 leading from the platform 20 of the floating body 1 lead to these viewing platforms.

Along its entire frame periphery, the frame includes buoyancy bodies 31, which for their part may be foamed hollow bodies. In this case, the frame-shaped floating body includes ballast tanks 32 on the inner side of the frame, in the form of hollow plastics bodies which lie parallel next to one another. They are disposed parallel to the direction in which the tunnel extends, in each case adjacent to the companionways 6, 7. Some of these ballast tanks 32 may be filled with drinking water, others with sea water, while the remaining ballast tanks can be used to hold waste water. In the exemplary embodiment, there are four ballast tanks 32 on both sides of each companionway 6, 7. Furthermore, the floating body 1 includes flap-closed buoyancy chambers 33 on the inner side of the frame. These can be used, for example, to hold lounger chairs, tables, parasols, etc. Electrical power supply components can also be accommodated therein.

The floating body 1 has a dismantleable framework 34, the horizontally running carriers 35 of which carry the ballast tanks 32. The horizontal carriers 35 which lie at the bottom are in this case supported by vertical carriers 36 which are formed as gusset plates and for their part are secured to the companionways 6, 7. In each case two horizontal carriers 36' which are triangular in contour are associated with each side of the companionway 6, 7. The gusset plates or vertical carriers 36 are provided with apertures 36' in order to keep reflections at a low level. However, as an alternative to triangular gusset plates, it would also be possible to use corresponding supporting struts. See-through plastics are used for the gusset plates or vertical carriers 36. To increase the size of the area of the floating body 1 which can be walked upon, platforms which are fitted to the outer sides of the frame sections 2 to 5 may be provided.

The dismantleable framework 34 and the carriers 35, 36 and buoyancy bodies are created in such a way that, in the dismantled state, they can be fitted in a plurality of 40-foot containers.

The floating body is assembled at the site of use. In this context, it is advantageous in terms of assembly technology for the upper edge of the companionway 6, 7 to be adhesively bonded into a groove 37 on the lower edge of the cabin, cf. FIG. 4.

To take account of the required safety regulations, a railing 38 is associated with the platform 20 on both the outer side of the frame and the inner side of the frame.

It can be seen in particular from the plan view in FIG. 3 that the area of water which lies inside the frame can be used, for example, as a swimming pool. It is also possible to use the floating body in a dolphinarium. This purpose is served by a net 39 which is laid around the floating body 1 and extends as far as the seabed or is closed at the bottom side. If it extends as far as the seabed, by way of example the lower edge of the net can be made heavier by suitable weights in order to stabilize the position of the net 39.

The modification to the first embodiment shown in FIGS. 8 and 9 shows that there is a differently configured basic contour of the companionway 6, 7. The side wall 40 which lies opposite the tunnel 11 now runs in the form of a semicircular curve, which brings advantages when observing the underwater world. To be able to ensure sealed connection of the lower edge of the cabin 24, 25 to the companionway 6, 7, the lower edge of the cabin is equipped with adapter fittings 41 which enable the lower edge of the cabin to be matched to the upper edge of the companionway 6, 7.

The second embodiment of the floating body 1' shown in FIGS. 10 to 14 largely corresponds to the first embodiment. Identical components are provided with identical reference symbols. The floating body 1 includes a multiplicity of individual elements which are connected to one another and for their part are configured in the form of cuboidal hollow bodies. The individual elements which lie on the outer side of the frame are foamed buoyancy bodies 42. Storage spaces 43 which are closed off by a flap extend toward the inner side of the frame. Then, the fillable ballast tanks 44 are provided on both sides of each companionway 6, 7.

Figure 11:
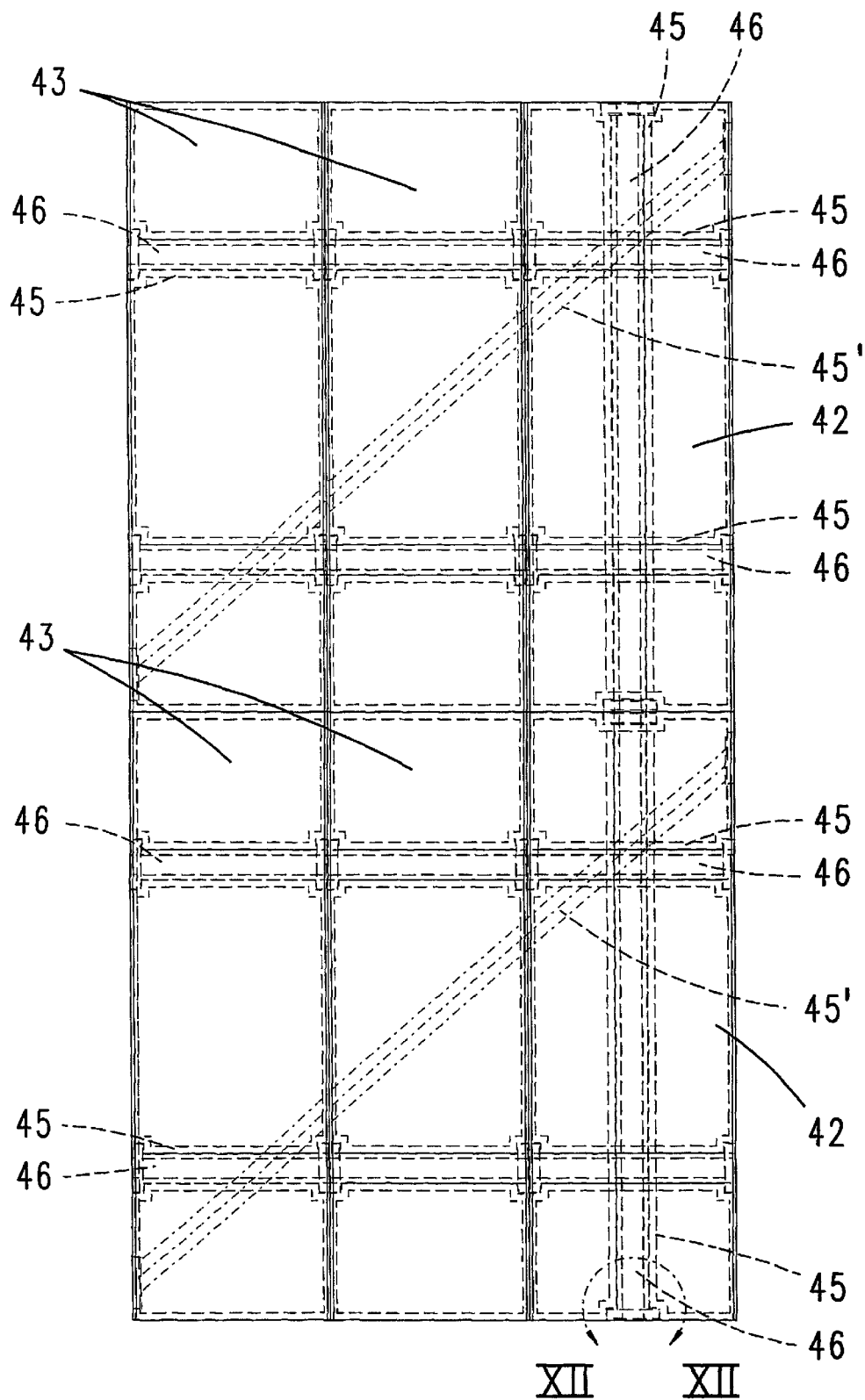
FIG. 11 shows a view of a plurality of the cuboidal hollow bodies which are used in the embodiment shown in FIG. 10 and are connected to one another by means of clamping elements.
Figure 12:
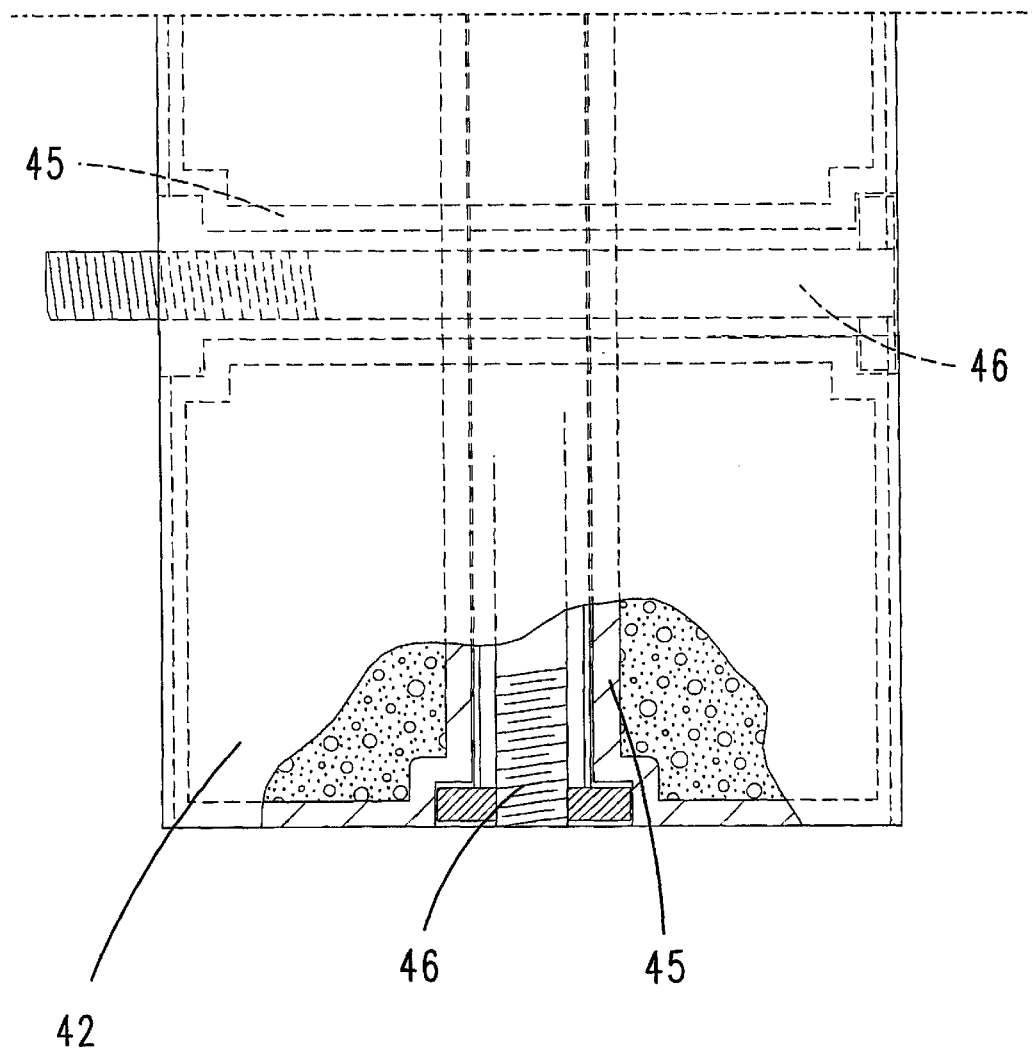
FIG. 12 shows a view on a larger scale in the connecting region of two clamping elements.

The individual elements, which have largely an identical structure, namely the buoyancy bodies 42, the storage spaces 43 and ballast tanks 44, consist of plastics and are made using the rotational process. In this process, tubes 45, which are disposed in the corresponding hollow bodies 42, 43, 44, run in a straight line and open out into different vertical surfaces, are formed integrally as distance-stabilizing elements to which pressure can be applied. These elements are used to accommodate clamping elements 46, a clamping element 46 being guided through at least two tubes 45, which are flush with one another, of two individual elements. As illustrated in FIGS. 11 and 12, the clamping can be effected by means of bolted connection.

Figure 13:
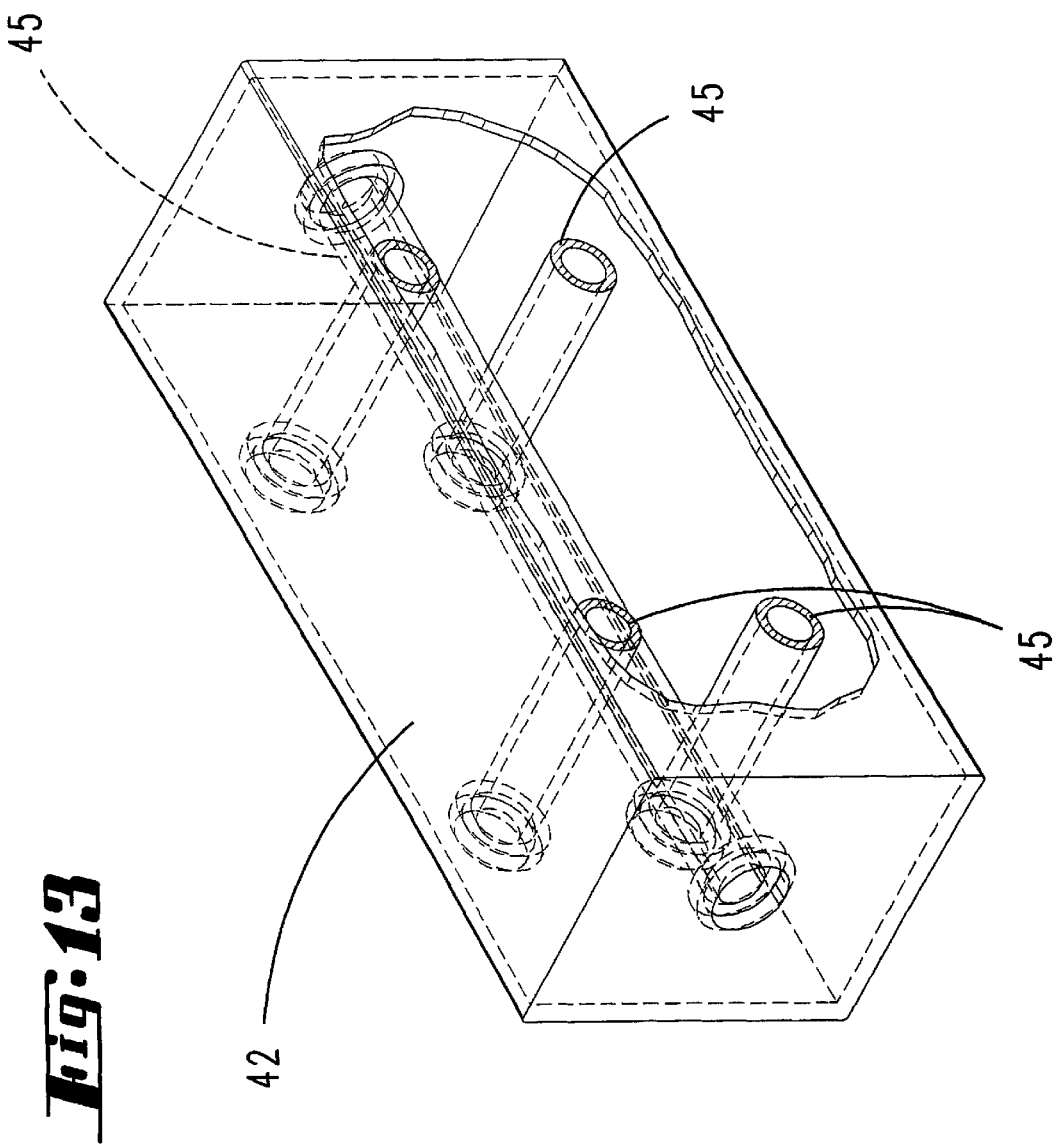
FIG. 13 shows a perspective illustration of a hollow body which represents an individual element.

It can be seen in particular from FIG. 13 that the tubes 45 which cross one another are disposed in such a way that the crossing points lie in different planes. FIG. 11 uses dot-dashed lines to illustrate that it is also possible for the tubes 45' to be allowed to run obliquely. As a result, it is possible overall to produce a highly stable clamping structure in grid form, associated with the advantage of a stable floating body.

Figure 14:
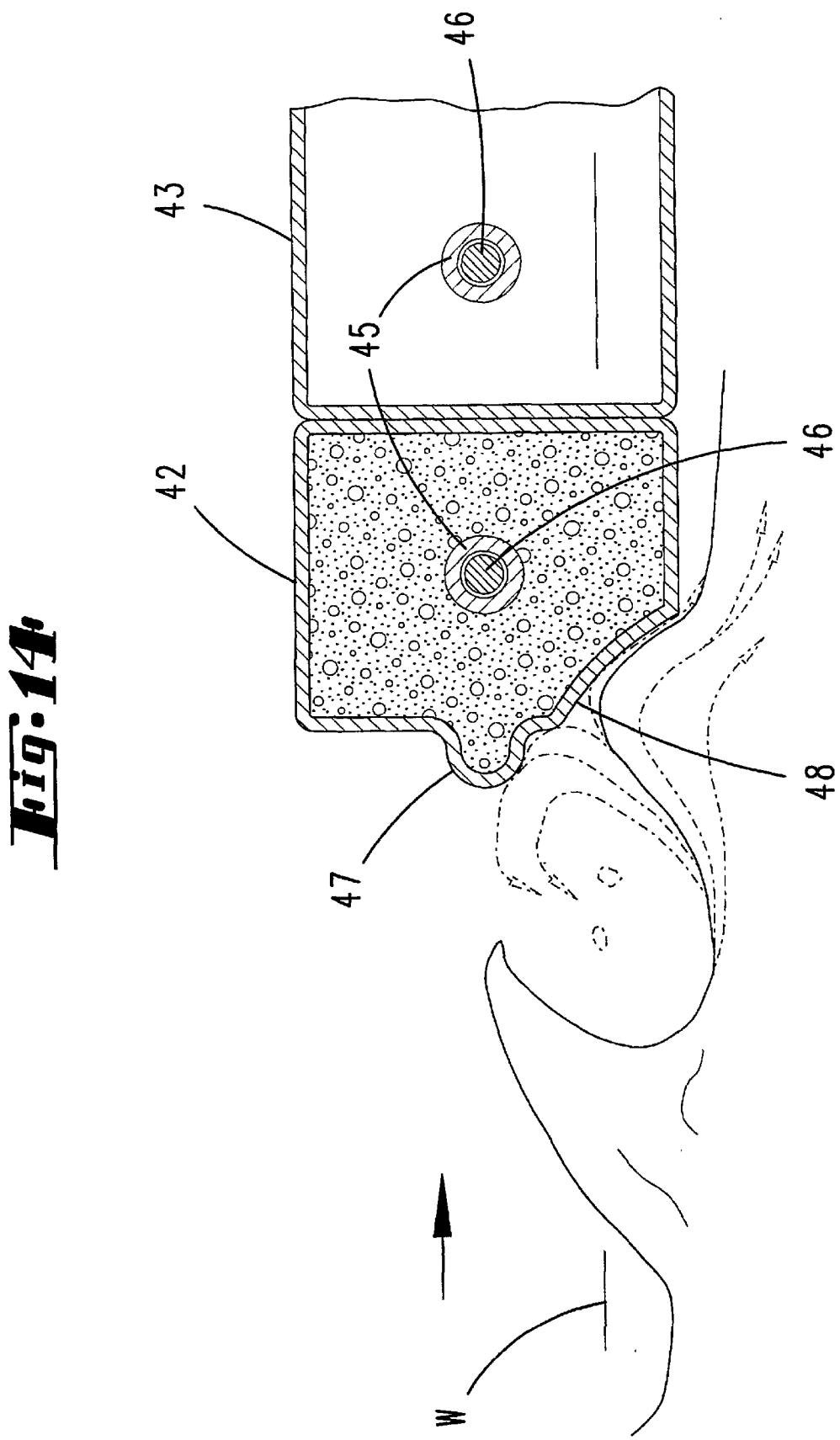
FIG. 14 shows a cross section through a buoyancy body which is located on the outer side of the frame and forms a breakwater bead and a wave-rolling niche below it.
Figure 15:
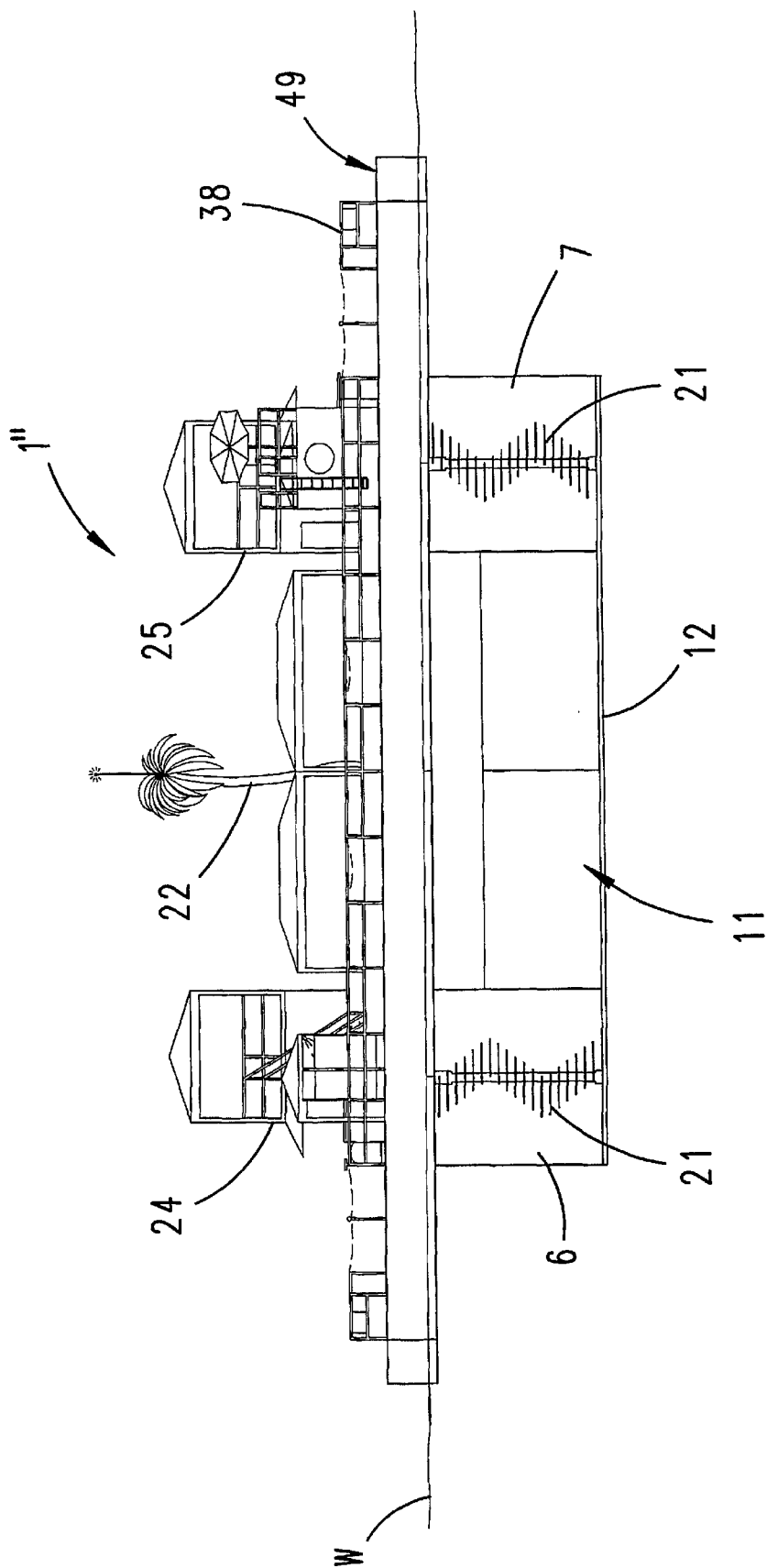
FIG. 15 shows a view of the floating body according to the third embodiment.
Figure 16:
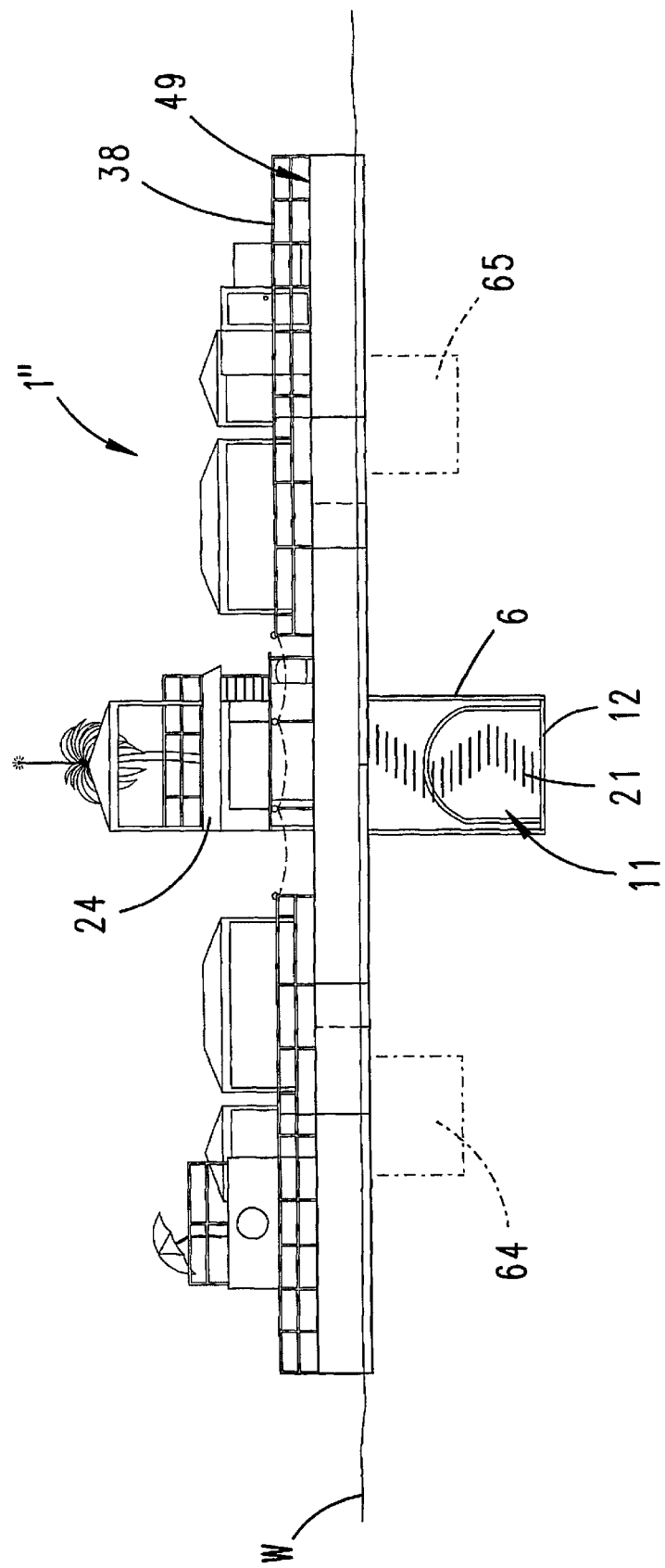
FIG. 16 shows a side view, rotated through 90°, of FIG. 15.
Figure 17:
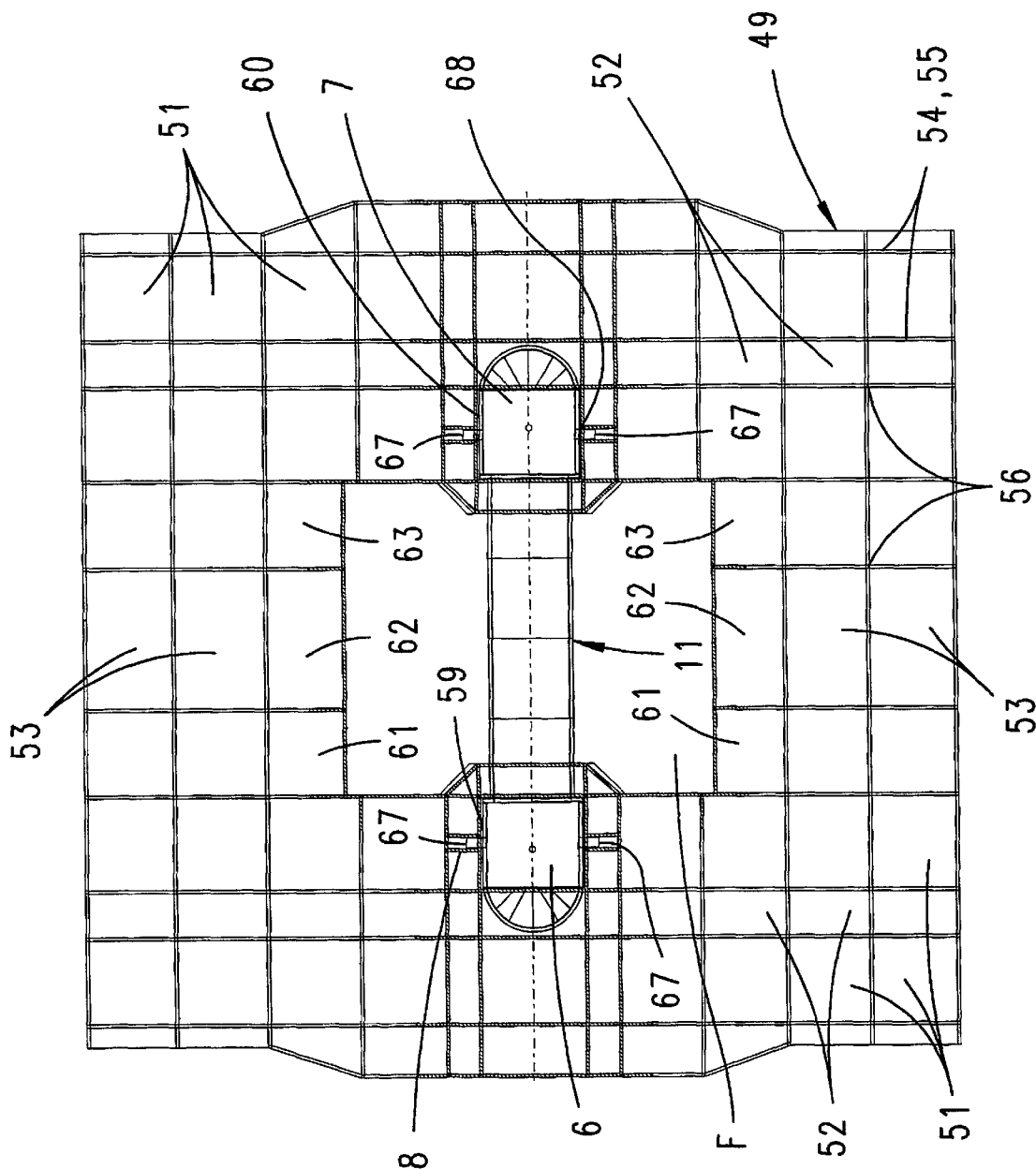
FIG. 17 shows a plan view of the flexurally rigid supporting framework with associated tunnel.
Figure 18:
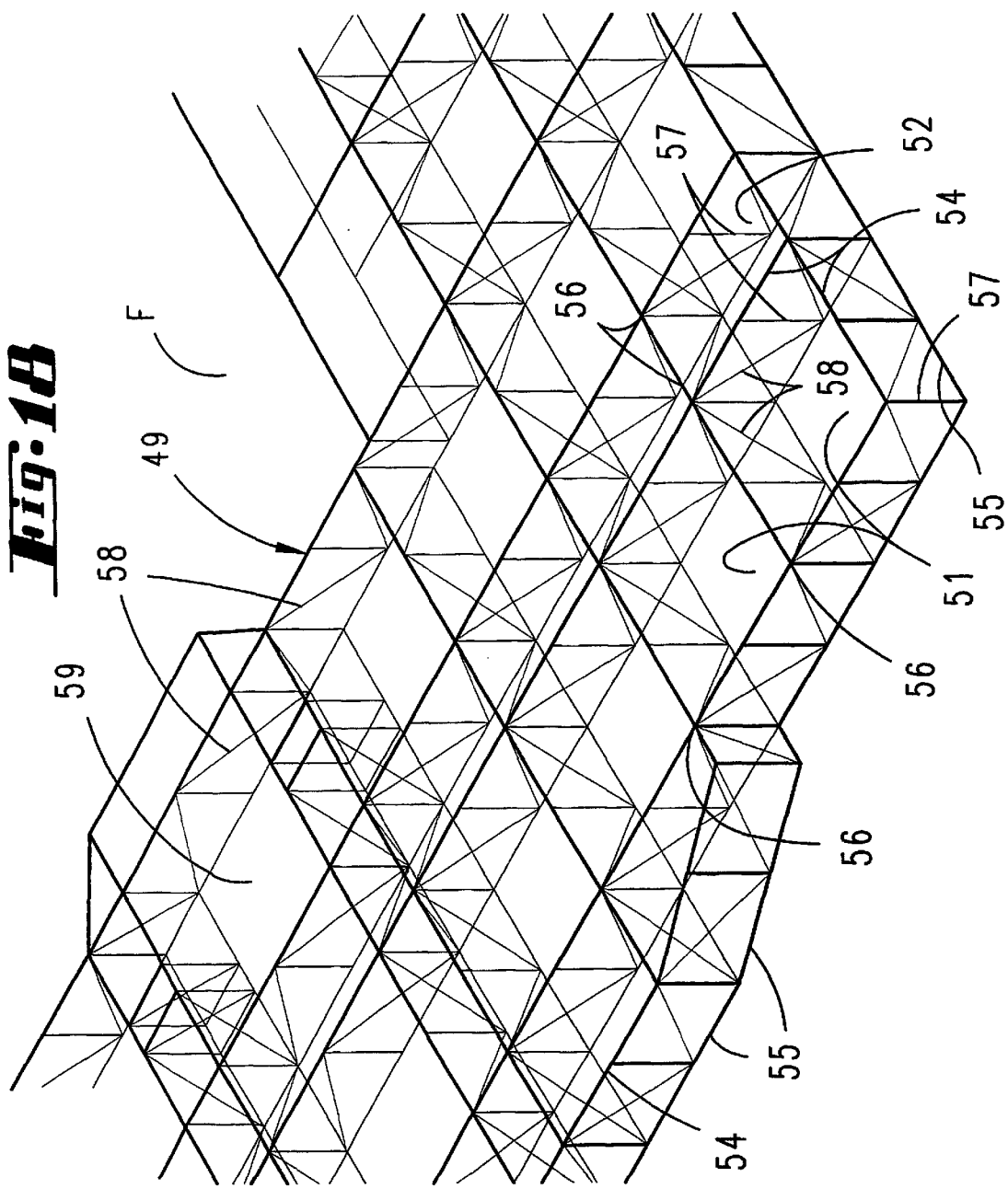
FIG. 18 shows a perspective view of part of the supporting framework.
Figure 19:
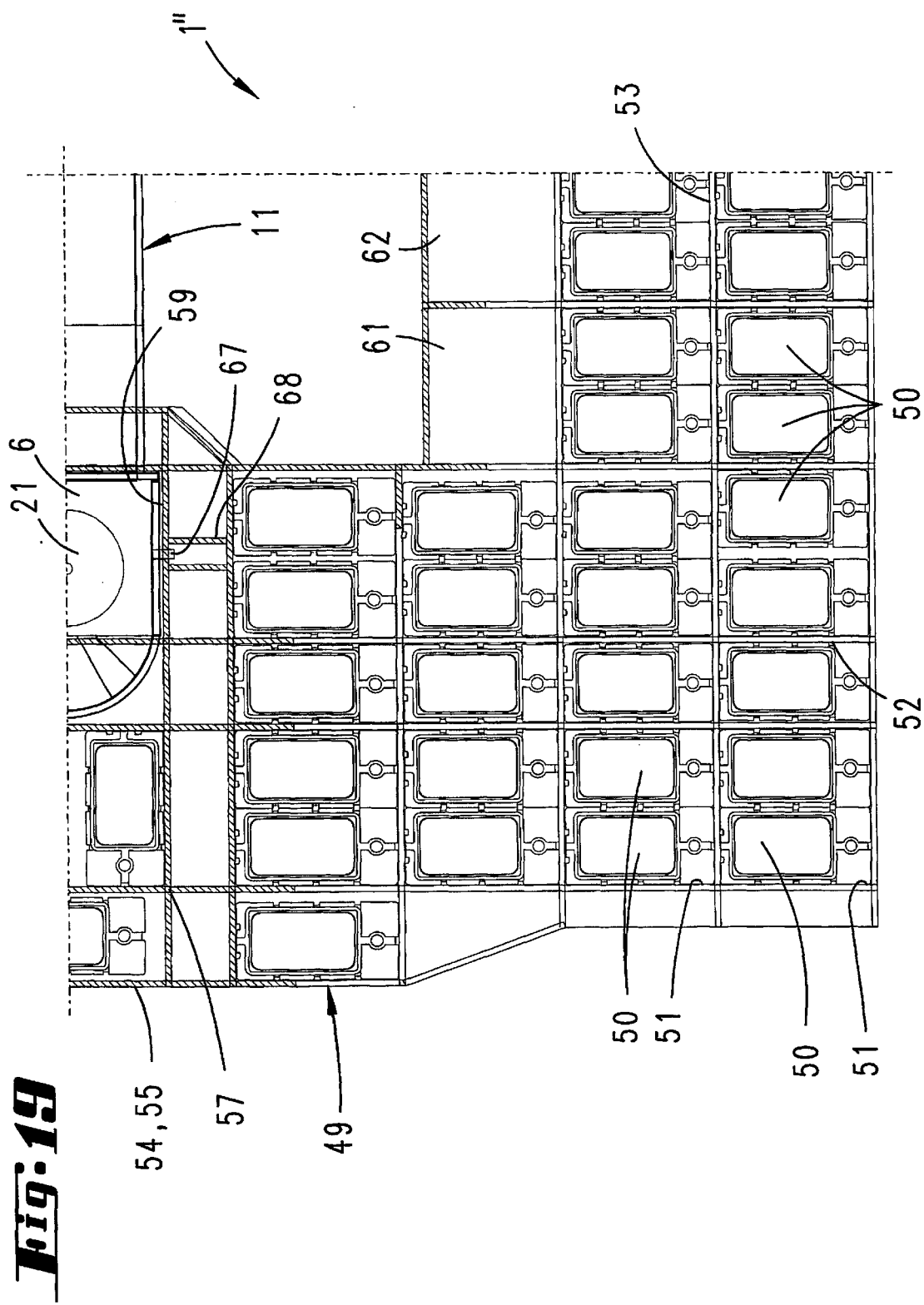
FIG. 19 shows a partial plan view of the supporting framework with associated hollow bodies.
Figure 20:
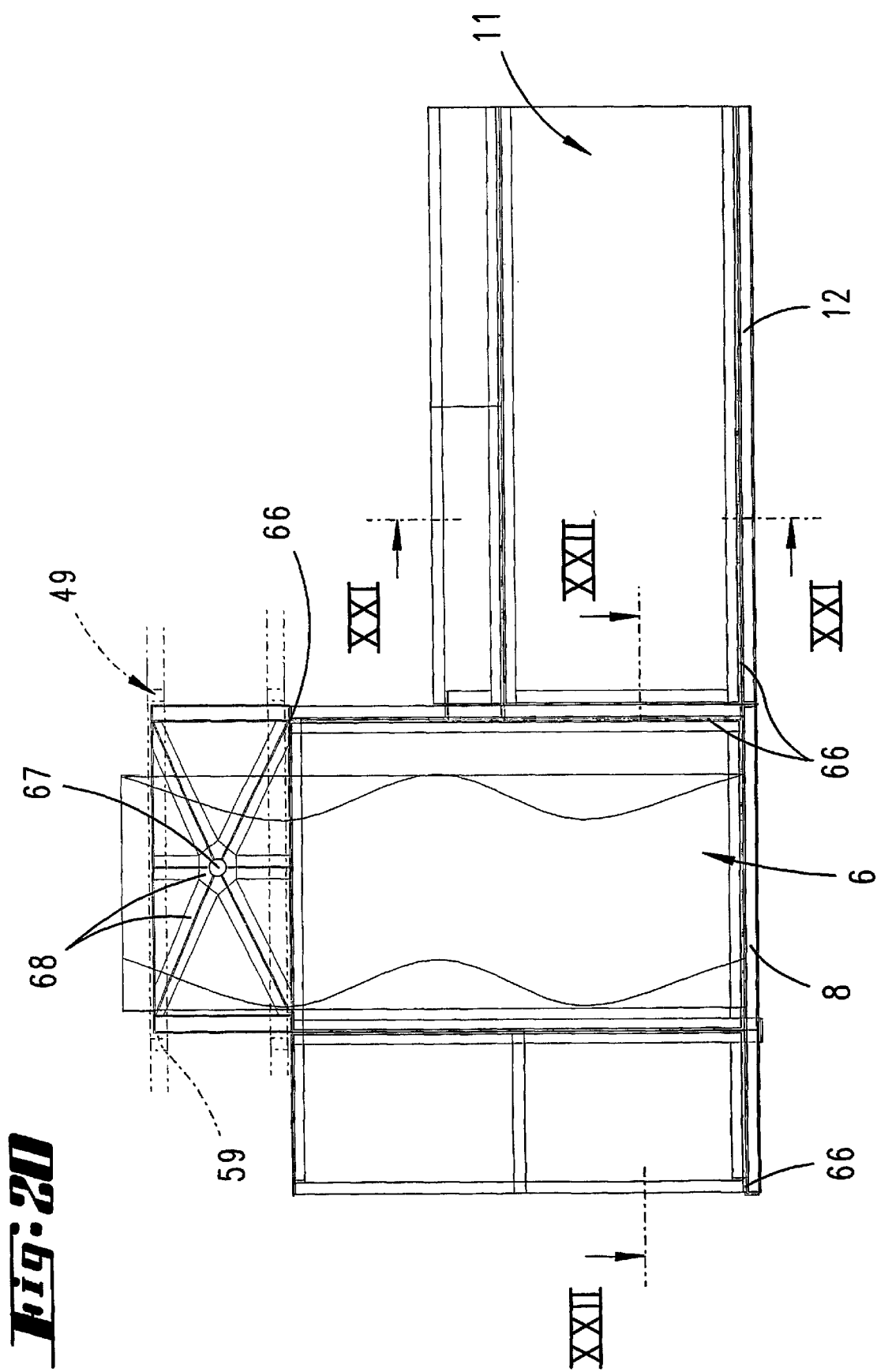
FIG. 20 shows a longitudinal section through half a tunnel.
Figure 21:
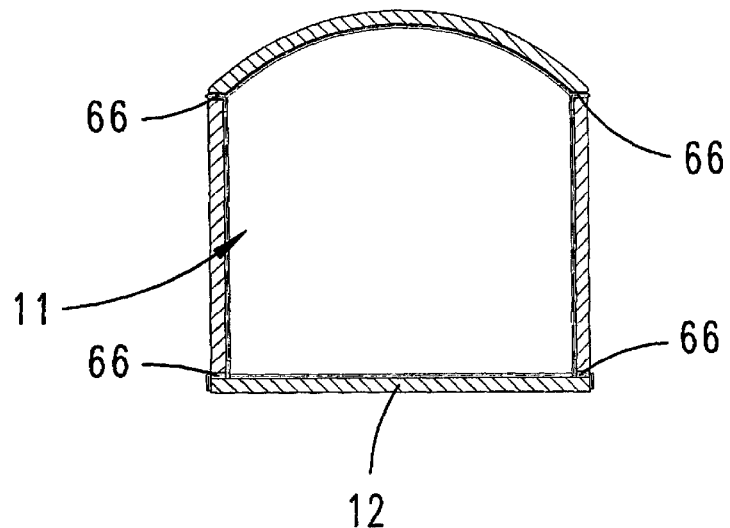
FIG. 21 shows the section on line XXI—XXI in FIG. 20.
Figure 22:
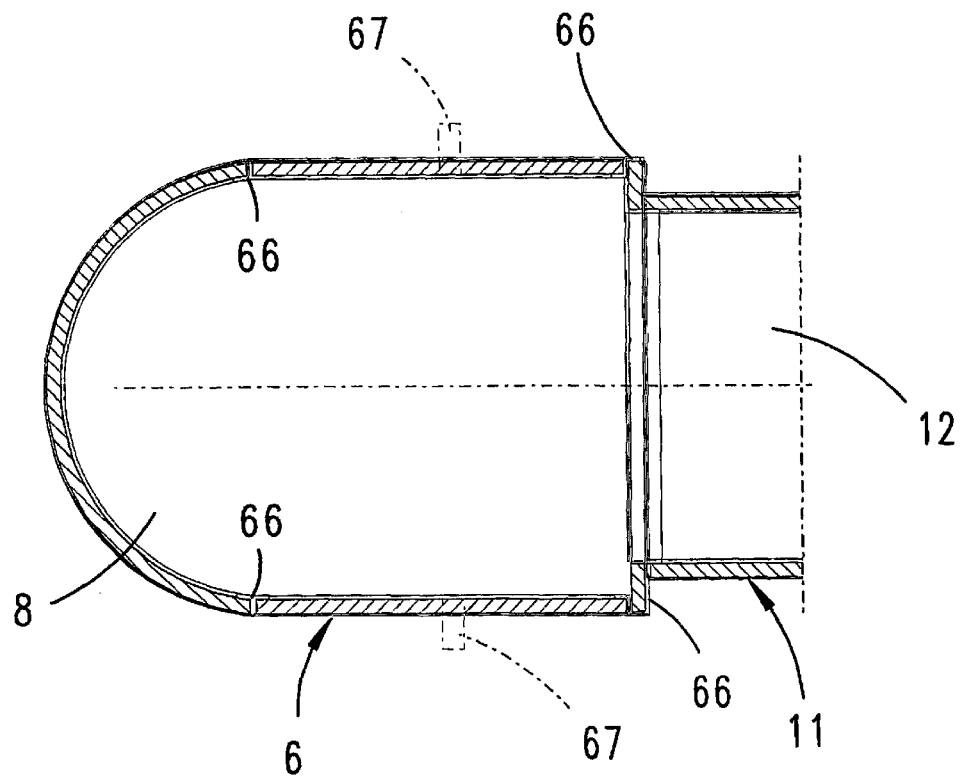
FIG. 22 shows the section on line XXII—XXII in FIG. 20.

FIG. 14 illustrates that the edge-side individual elements, i.e. the buoyancy bodies 42, include an integrally formed breakwater bead 47. Below this there is additionally a wave-rolling niche 48. The result of this is that a wave is diverted downward and the formation of spray is greatly reduced as a result. A further function is fulfilled by the breakwater bead 47 through the fact that it serves as an encircling washboard, providing advantages during the mooring of vessels which are used to bring aboard and take away people visiting the floating body, for example. The size of the floating body described above is dimensioned in such a way that there is space for at most 250 people thereon.

The floating body 1" in accordance with the third embodiment, illustrated in FIGS. 15 to 27, is likewise a carrier for an underwater tunnel 11, and specifically a flexurally rigid supporting framework 49 in the form of a horizontal grid is used for this purpose. Hollow bodies 50 which can be used as tanks, buoyancy bodies, ballast bodies, storage chambers or the like are secured in the rectangular open grid spaces 51, 52, 53 of this grid.

The grid webs which border the open grid spaces 51, 52, 53 have upper and lower struts 54, 55 which are spaced apart from and parallel to one another, the spacing position of which is defined by vertical struts 57 associated with the grid crossing points 56. In addition, diagonal struts 58 are used to reinforce the spacing position of the upper and lower struts 54, 55 with respect to one another.

Centrally, the grid framework 49 includes an area of open water F which is of substantially rectangular configuration. Adjacent to the two mutually opposite longitudinal edges of the area of open water F are open grid spaces 59, 60, from which the companionways 6, 7, which for their part are connected to one another in a watertight manner by the tunnel 11, originate. The grid webs which adjoin the companionways 6, 7 and the grid webs which delimit the area of open water F consist of steel, in particular stainless steel, and are indicated by hatching in FIG. 17. The adjacent peripheral grid webs, by contrast, consist of fiberglass and are not indicated by hatching in FIG. 17.

The open grid spaces 51, which are of square configuration, are dimensioned in such a way that they are each able to accommodate two hollow bodies 50. The open grid spaces 52 are of rectangular contour and are each only able to accommodate one hollow body 50. By contrast, three hollow bodies 50 lying next to one another may be provided in the open grid spaces 53, which are larger than the open grid spaces 51.

The open grid spaces 61, 62 which are adjacent to the narrow sides of the area of open water F do not hold any hollow bodies. There, as can be seen from the dot-dashed illustration in FIG. 16, it is possible for there to be additional tanks 64, 65, which project below the water line W, as rooms. These can be used, for example, to take a snack, etc. These tanks 64, 65 too may be made transparent.

The tunnel 11 and the companionways 6, 7 are see-through planked steel frame structures. Steel frame profiled sections 66 of different cross-sectional shape, which are planked with the tunnel walls and the tunnel floor 12 and with the walls of the companionways 6, 7, are used for this purpose. With regard to the either planar or curved walls, they are plates consisting of transparent plastics with a thickness of approx. 100 mm.

Since considerable buoyancy forces act on the tunnel 11 and the companionways 6, 7 and these forces have to be absorbed, two laterally protruding bearing journals 67, which for their part divert the buoyancy forces into yokes 68, which are associated with the bearing journals 67, of the supporting framework 49, originate from each companionway 6, 7. These yokes 68 are for their part adjacently associated with the open grid spaces 59, 60.

The hollow bodies 50 are substantially cuboidal tanks. They are produced from suitable plastics using the rotational process. Each hollow body 50 is rectangular in form and is equipped with means (not shown in more detail) for fixedly connecting the hollow bodies to the supporting framework. This connection option is also available among the hollow bodies 50 themselves. Each hollow body can be closed off by means of a cover 69. In this way, it is possible to use the hollow bodies as tanks or buoyancy bodies. They may also form ballast bodies, storage chambers, etc.

As is also the case in the first embodiment, a ballast body 22, which is configured as an island and for its part is supported by means of its lower end on the tunnel ceiling, is associated with tunnel 11. The ballast body 22 or the island which it forms may, for example, be continuously connected to the walking area of the supporting framework 49 via a bridge web, which is not illustrated.

By way of example for a special event, such as a dance, the area of open water F can be covered by boards 70. Carriers 71, 72, which are preferably stored beneath the edges of the supporting framework and can be displaced over the area of open water F, are used as carriers for the boards 70. These carriers are equipped at their ends with rollers 73, which for their part roll over edge-side rails 74. In the storage position, the boards 70 are situated next to one another, in a fan-like disposition, connected by means of hinges, bellow the control area of the supporting framework 49. In combination with a displacement of the carriers 71, 72 into the supporting position, the boards 70 are moved into a flat plane with respect to one another, so that the total walkable area of the supporting framework is additionally enlarged by the size of the area of open water F. FIG. 24, left-hand side and FIG. 25 show the stored position of the carriers 71, while the right-hand side in FIG. 24 illustrates the supporting position of the carriers 71.

All the features disclosed are (inherently) pertinent to the invention. The content of disclosure of the associated/appended priority documents (copy of the prior application) is hereby incorporated in its entirety in the disclosure of the present application, partly with a view to including features of these documents in claims of the present application.

I claim:

1. A floating body having a tunnel (11), which extends between two companionways (6, 7), lies below waterline and has an at least partially transparent wall, wherein the companionways (6, 7) are coordinated with a frame (2, 3) which has buoyancy bodies and ballast bodies, floats on water and surrounds an area open water, and the tunnel (11) crosses below the area of open water (F).

2. The floating body according to claim 1, wherein the tunnel (11) crosses below the area of open water (F) approximately centrally.

3. The floating body according to claim 1, wherein a flexurally rigid supporting framework (34, 49) in form of a horizontal grid, in rectangular, open grid spaces (51, 52, 53) of which hollow bodies after (31, 50), which are useable as tanks, buoyancy bodies, ballast bodies, storage chambers are secured.

4. The floating body according to claim 1, wherein the companionways (6, 7) are coordinated with two frame sections (2, 3) which lie opposite one another.

5. The floating body according to claim 1, wherein the tunnel (11) has a transparent floor (12), and a wall of the tunnel as a whole is see-through.

6. The floating body according to claim 1, wherein at least area of the companionway (6, 7) which lies below the water line (W) comprises see-through plastics.

7. The floating body according to claim 1, wherein the companionways (6, 7) have cabins (24, 25) built thereabove.

8. The floating body according to claim 1, wherein the buoyancy bodies (31, 42, 50) extend virtually along the entire frame periphery.

9. The floating body according to claim 1, wherein the floating body (1, 1") has a dismantleable framework (34, 49) comprising carriers.

10. The floating body according to claim 1, wherein the tunnel (11) and the companionways (6, 7) are each see-through planked frame structures.

11. The floating body according to claim 1, wherein the area of open water is coverable by boards (70).

12. The floating body according to claim 1, wherein the tunnel 11 has a transparent floor (12).

13. The floating body according to claim 1, wherein a wall of the tunnel as a whole is see-through.

* * * * *